US007349753B2

(12) United States Patent
Paik

(10) Patent No.: US 7,349,753 B2
(45) Date of Patent: *Mar. 25, 2008

(54) ADJUSTING MANUFACTURING PROCESS CONTROL PARAMETER USING UPDATED PROCESS THRESHOLD DERIVED FROM UNCONTROLLABLE ERROR

(75) Inventor: Young J. Paik, Campbell, CA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/102,438

(22) Filed: Apr. 8, 2005

(65) Prior Publication Data

US 2005/0267607 A1 Dec. 1, 2005

Related U.S. Application Data

(63) Continuation of application No. 10/855,711, filed on May 28, 2004, now Pat. No. 6,961,626.

(51) Int. Cl.
*G06F 19/00* (2006.01)
*G05B 13/02* (2006.01)

(52) U.S. Cl. .................... 700/110; 700/31; 700/51; 700/109

(58) Field of Classification Search ............. 700/31, 700/33, 34, 51, 44, 45, 108–110; 702/84
See application file for complete search history.

(56) References Cited

U.S. PATENT DOCUMENTS 3,208,485 A 9/1965 Tiffany (Continued)

FOREIGN PATENT DOCUMENTS

CA 2050247 8/1991

(Continued)

OTHER PUBLICATIONS

1999. "Contactless Bulk Resistivity/Sheet Resistance Measurement and Mapping Systems," www.Lehighton.com/fattechl/index.html.

(Continued)

*Primary Examiner*—Ryan A. Jarrett
(74) *Attorney, Agent, or Firm*—Wilmer Cutler Pickering Hale & Dorr

(57) ABSTRACT

A method, system and medium are provided for enabling improved feedback and feedforward control. An error, or deviation from target result, is observed during manufacture of semi conductor chips. The error within standard deviation is caused by two components: a white noise component and a signal component (such as systematic errors). The white noise component is random noise and therefore is relatively non-controllable. The systematic error, in contrast, may be controlled by changing the control parameters. A ratio between the two components is calculated autoregressively. Based on the ratio and using the observed or measured error, the actual value of the error caused by the signal component is calculated utilizing an autoregressive stochastic sequence. The actual value of the error is then used in determining when and how to change the control parameters. The autoregressive stochastic sequence addresses the issue of real-time control of the effects of run-to-run deviations, and provides a mechanism that can extract white noise from the statistical process variance in real time. This results in an ability to provide tighter control of feedback and feedforward variations.

31 Claims, 6 Drawing Sheets

U.S. PATENT DOCUMENTS

| | | | |
|---|---|---|---|
| 3,229,198 A | 1/1966 | Libby | |
| 3,767,900 A | 10/1973 | Chao et al. | |
| 3,920,965 A | 11/1975 | Sohrwardy | |
| 4,000,458 A | 12/1976 | Miller et al. | |
| 4,207,520 A | 6/1980 | Flora et al. | |
| 4,209,744 A | 6/1980 | Gerasimov et al. | |
| 4,302,721 A | 11/1981 | Urbanek et al. | |
| 4,368,510 A | 1/1983 | Anderson | |
| 4,609,870 A | 9/1986 | Lale et al. | |
| 4,616,308 A | 10/1986 | Morshedi et al. | |
| 4,663,703 A | 5/1987 | Axelby et al. | |
| 4,698,766 A | 10/1987 | Entwistle et al. | |
| 4,750,141 A | 6/1988 | Judell et al. | |
| 4,755,753 A | 7/1988 | Chern | |
| 4,757,259 A | 7/1988 | Charpentier | |
| 4,796,194 A | 1/1989 | Atherton | |
| 4,901,218 A | 2/1990 | Cornwell | |
| 4,938,600 A | 7/1990 | Into | |
| 4,957,605 A | 9/1990 | Hurwitt et al. | |
| 4,967,381 A | 10/1990 | Lane et al. | |
| 5,089,970 A | 2/1992 | Lee et al. | |
| 5,108,570 A | 4/1992 | Wang | |
| 5,208,765 A | 5/1993 | Turnbull | |
| 5,220,517 A | 6/1993 | Sierk et al. | |
| 5,226,118 A | 7/1993 | Baker et al. | |
| 5,231,585 A | 7/1993 | Kobayashi et al. | |
| 5,236,868 A | 8/1993 | Nulman | |
| 5,240,552 A | 8/1993 | Yu et al. | |
| 5,260,868 A | 11/1993 | Gupta et al. | |
| 5,270,222 A | 12/1993 | Moslehi | |
| 5,283,141 A | 2/1994 | Yoon et al. | |
| 5,295,242 A | 3/1994 | Mashruwala et al. | |
| 5,309,221 A | 5/1994 | Fischer et al. | |
| 5,329,463 A | 7/1994 | Sierk et al. | |
| 5,338,630 A | 8/1994 | Yoon et al. | |
| 5,347,446 A | 9/1994 | Iino et al. | |
| 5,367,624 A | 11/1994 | Cooper | |
| 5,369,544 A | 11/1994 | Mastrangelo | |
| 5,375,064 A | 12/1994 | Bollinger | |
| 5,398,336 A | 3/1995 | Tantry et al. | |
| 5,402,367 A | 3/1995 | Sullivan et al. | |
| 5,408,405 A | 4/1995 | Mozumder et al. | |
| 5,410,473 A | 4/1995 | Kaneko et al. | |
| 5,420,796 A | 5/1995 | Weling et al. | |
| 5,427,878 A | 6/1995 | Corliss | |
| 5,444,837 A | 8/1995 | Bomans et al. | |
| 5,469,361 A | 11/1995 | Moyne | |
| 5,485,082 A | 1/1996 | Wisspeintner et al. | |
| 5,490,097 A | 2/1996 | Swenson et al. | |
| 5,495,417 A | 2/1996 | Fuduka et al. | |
| 5,497,316 A | 3/1996 | Sierk et al. | |
| 5,497,381 A | 3/1996 | O'Donoghue et al. | |
| 5,503,707 A | 4/1996 | Maung et al. | |
| 5,508,947 A | 4/1996 | Sierk et al. | |
| 5,511,005 A | 4/1996 | Abbe et al. | |
| 5,519,605 A | 5/1996 | Cawlfield | |
| 5,525,808 A | 6/1996 | Irie et al. | |
| 5,526,293 A | 6/1996 | Mozumder et al. | |
| 5,534,289 A | 7/1996 | Bilder et al. | |
| 5,541,510 A | 7/1996 | Danielson | |
| 5,546,312 A | 8/1996 | Mozumder et al. | |
| 5,553,195 A | 9/1996 | Meijer | |
| 5,586,039 A | 12/1996 | Hirsch et al. | |
| 5,599,423 A | 2/1997 | Parker et al. | |
| 5,602,492 A | 2/1997 | Cresswell et al. | |
| 5,603,707 A | 2/1997 | Trombetta et al. | |
| 5,617,023 A | 4/1997 | Skalski | |
| 5,627,083 A | 5/1997 | Tounai | |
| 5,629,216 A | 5/1997 | Wijaranakula et al. | |
| 5,642,296 A | 6/1997 | Saxena | |
| 5,646,870 A | 7/1997 | Krivokapic et al. | |
| 5,649,169 A | 7/1997 | Berezin et al. | |
| 5,654,903 A | 8/1997 | Reitman et al. | |
| 5,655,951 A | 8/1997 | Meikle et al. | |
| 5,657,254 A | 8/1997 | Sierk et al. | |
| 5,661,669 A | 8/1997 | Mozumder et al. | |
| 5,663,797 A | 9/1997 | Sandhu | |
| 5,664,987 A | 9/1997 | Renteln | |
| 5,665,199 A | 9/1997 | Sahota et al. | |
| 5,665,214 A | 9/1997 | Iturralde | |
| 5,666,297 A | 9/1997 | Britt et al. | |
| 5,667,424 A | 9/1997 | Pan | |
| 5,674,787 A | 10/1997 | Zhao et al. | |
| 5,694,325 A | 12/1997 | Fukuda et al. | |
| 5,695,810 A | 12/1997 | Dubin et al. | |
| 5,698,989 A | 12/1997 | Nulman | |
| 5,719,495 A | 2/1998 | Moslehi | |
| 5,719,796 A | 2/1998 | Chen | |
| 5,735,055 A | 4/1998 | Hochbein et al. | |
| 5,740,033 A | 4/1998 | Wassick et al. | |
| 5,740,429 A | 4/1998 | Wang et al. | |
| 5,751,582 A | 5/1998 | Saxena et al. | |
| 5,754,297 A | 5/1998 | Nulman | |
| 5,761,064 A | 6/1998 | La et al. | |
| 5,761,065 A | 6/1998 | Kittler et al. | |
| 5,764,543 A | 6/1998 | Kennedy | |
| 5,777,901 A | 7/1998 | Berezin et al. | |
| 5,787,021 A | 7/1998 | Samaha | |
| 5,787,269 A | 7/1998 | Hyodo | |
| 5,808,303 A | 9/1998 | Schlagheck et al. | |
| 5,812,407 A | 9/1998 | Sato et al. | |
| 5,823,854 A | 10/1998 | Chen | |
| 5,824,599 A | 10/1998 | Schacham-Diamand et al. | |
| 5,825,356 A | 10/1998 | Habib et al. | |
| 5,825,913 A | 10/1998 | Rostami et al. | |
| 5,828,778 A | 10/1998 | Hagi et al. | |
| 5,831,851 A | 11/1998 | Eastburn et al. | |
| 5,832,224 A | 11/1998 | Fehskens et al. | |
| 5,838,595 A | 11/1998 | Sullivan et al. | |
| 5,838,951 A | 11/1998 | Song | |
| 5,844,554 A | 12/1998 | Geller et al. | |
| 5,857,258 A | 1/1999 | Penzes et al. | |
| 5,859,777 A | 1/1999 | Yokoyama et al. | |
| 5,859,964 A | 1/1999 | Wang et al. | |
| 5,859,975 A | 1/1999 | Brewer et al. | |
| 5,862,054 A | 1/1999 | Li | |
| 5,863,807 A | 1/1999 | Jang et al. | |
| 5,867,389 A | 2/1999 | Hamada et al. | |
| 5,870,306 A | 2/1999 | Harada | |
| 5,871,805 A | 2/1999 | Lemelson | |
| 5,883,437 A | 3/1999 | Maruyama et al. | |
| 5,889,991 A | 3/1999 | Consolatti et al. | |
| 5,901,313 A | 5/1999 | Wolf et al. | |
| 5,903,455 A | 5/1999 | Sharpe, Jr. et al. | |
| 5,910,011 A | 6/1999 | Cruse | |
| 5,910,846 A | 6/1999 | Sandhu | |
| 5,912,678 A | 6/1999 | Saxena et al. | |
| 5,916,016 A | 6/1999 | Bothra | |
| 5,923,553 A | 7/1999 | Yi | |
| 5,926,690 A | 7/1999 | Toprac et al. | |
| 5,930,138 A | 7/1999 | Lin et al. | |
| 5,940,300 A | 8/1999 | Ozaki | |
| 5,943,237 A | 8/1999 | Van Boxem | |
| 5,943,550 A | 8/1999 | Fulford, Jr. et al. | |
| 5,960,185 A | 9/1999 | Nguyen | |
| 5,960,214 A | 9/1999 | Sharpe, Jr. et al. | |
| 5,961,369 A | 10/1999 | Bartels et al. | |
| 5,963,881 A | 10/1999 | Kahn et al. | |
| 5,975,994 A | 11/1999 | Sandhu et al. | |
| 5,978,751 A | 11/1999 | Pence et al. | |
| 5,982,920 A | 11/1999 | Tobin, Jr. et al. | |
| 6,002,989 A | 12/1999 | Shiba et al. | |
| 6,012,048 A | 1/2000 | Gustin et al. | |
| 6,017,771 A | 1/2000 | Yang et al. | |

| Patent | Date | Inventor |
|---|---|---|
| 6,036,349 A | 3/2000 | Gombar |
| 6,037,664 A | 3/2000 | Zhao et al. |
| 6,041,263 A | 3/2000 | Boston et al. |
| 6,041,270 A | 3/2000 | Steffan et al. |
| 6,054,379 A | 4/2000 | Yau et al. |
| 6,059,636 A | 5/2000 | Inaba et al. |
| 6,064,759 A | 5/2000 | Buckley et al. |
| 6,072,313 A | 6/2000 | Li et al. |
| 6,074,443 A | 6/2000 | Venkatesh et al. |
| 6,077,412 A | 6/2000 | Ting et al. |
| 6,078,845 A | 6/2000 | Friedman |
| 6,094,688 A | 7/2000 | Mellen-Garnett et al. |
| 6,096,649 A | 8/2000 | Jang |
| 6,097,887 A | 8/2000 | Hardikar et al. |
| 6,100,195 A | 8/2000 | Chan et al. |
| 6,108,092 A | 8/2000 | Sandhu |
| 6,111,634 A | 8/2000 | Pecen et al. |
| 6,112,130 A | 8/2000 | Fukuda et al. |
| 6,113,462 A | 9/2000 | Yang |
| 6,114,238 A | 9/2000 | Liao |
| 6,127,263 A | 10/2000 | Parikh |
| 6,128,016 A | 10/2000 | Coelho et al. |
| 6,136,163 A | 10/2000 | Cheung et al. |
| 6,141,660 A | 10/2000 | Bach et al. |
| 6,143,646 A | 11/2000 | Wetzel |
| 6,148,099 A | 11/2000 | Lee et al. |
| 6,148,239 A | 11/2000 | Funk et al. |
| 6,148,246 A | 11/2000 | Kawazome |
| 6,150,270 A | 11/2000 | Matsuda et al. |
| 6,157,864 A | 12/2000 | Schwenke et al. |
| 6,159,075 A | 12/2000 | Zhang |
| 6,159,644 A | 12/2000 | Satoh et al. |
| 6,161,054 A | 12/2000 | Rosenthal et al. |
| 6,169,931 B1 | 1/2001 | Runnels |
| 6,172,756 B1 | 1/2001 | Chalmers et al. |
| 6,173,240 B1 | 1/2001 | Sepulveda et al. |
| 6,175,777 B1 | 1/2001 | Kim |
| 6,178,390 B1 | 1/2001 | Jun |
| 6,181,013 B1 | 1/2001 | Liu et al. |
| 6,183,345 B1 | 2/2001 | Kamono et al. |
| 6,185,324 B1 | 2/2001 | Ishihara et al. |
| 6,191,864 B1 | 2/2001 | Sandhu |
| 6,192,291 B1 | 2/2001 | Kwon |
| 6,197,604 B1 | 3/2001 | Miller et al. |
| 6,204,165 B1 | 3/2001 | Ghoshal |
| 6,210,983 B1 | 4/2001 | Atchison et al. |
| 6,211,094 B1 | 4/2001 | Jun et al. |
| 6,212,961 B1 | 4/2001 | Dvir |
| 6,214,734 B1 | 4/2001 | Bothra et al. |
| 6,217,412 B1 | 4/2001 | Campbell et al. |
| 6,219,711 B1 | 4/2001 | Chari |
| 6,222,936 B1 | 4/2001 | Phan et al. |
| 6,226,563 B1 | 5/2001 | Lim |
| 6,226,792 B1 | 5/2001 | Goiffon et al. |
| 6,228,280 B1 | 5/2001 | Li et al. |
| 6,230,069 B1 | 5/2001 | Campbell et al. |
| 6,236,903 B1 | 5/2001 | Kim et al. |
| 6,237,050 B1 | 5/2001 | Kim et al. |
| 6,240,330 B1 | 5/2001 | Kurtzberg et al. |
| 6,240,331 B1 | 5/2001 | Yun |
| 6,245,581 B1 | 6/2001 | Bonser et al. |
| 6,246,972 B1 | 6/2001 | Klimasauskas |
| 6,248,602 B1 | 6/2001 | Bode et al. |
| 6,249,712 B1 | 6/2001 | Boiquaye |
| 6,252,412 B1 | 6/2001 | Talbot et al. |
| 6,253,366 B1 | 6/2001 | Mutschler, III |
| 6,259,160 B1 | 7/2001 | Lopatin et al. |
| 6,263,255 B1 | 7/2001 | Tan et al. |
| 6,268,270 B1 | 7/2001 | Scheid et al. |
| 6,271,670 B1 | 8/2001 | Caffey |
| 6,276,989 B1 | 8/2001 | Campbell et al. |
| 6,277,014 B1 | 8/2001 | Chen et al. |
| 6,278,899 B1 | 8/2001 | Piche et al. |
| 6,280,289 B1 | 8/2001 | Wiswesser et al. |
| 6,281,127 B1 | 8/2001 | Shue |
| 6,284,622 B1 | 9/2001 | Campbell et al. |
| 6,287,879 B1 | 9/2001 | Gonzales et al. |
| 6,290,572 B1 | 9/2001 | Hofmann |
| 6,291,367 B1 | 9/2001 | Kelkar |
| 6,292,708 B1 | 9/2001 | Allen et al. |
| 6,298,274 B1 | 10/2001 | Inoue |
| 6,298,470 B1 | 10/2001 | Breiner et al. |
| 6,303,395 B1 | 10/2001 | Nulman |
| 6,304,999 B1 | 10/2001 | Toprac et al. |
| 6,307,628 B1 | 10/2001 | Lu et al. |
| 6,314,379 B1 | 11/2001 | Hu et al. |
| 6,317,643 B1 | 11/2001 | Dmochowski |
| 6,320,655 B1 | 11/2001 | Matsushita et al. |
| 6,324,481 B1 | 11/2001 | Atchison et al. |
| 6,334,095 B1 * | 12/2001 | Smith ........................ 702/181 |
| 6,334,807 B1 | 1/2002 | Lebel et al. |
| 6,336,841 B1 | 1/2002 | Chang |
| 6,339,727 B1 | 1/2002 | Ladd |
| 6,340,602 B1 | 1/2002 | Johnson et al. |
| 6,345,288 B1 | 2/2002 | Reed et al. |
| 6,345,315 B1 | 2/2002 | Mishra |
| 6,346,426 B1 | 2/2002 | Toprac et al. |
| 6,355,559 B1 | 3/2002 | Havemann et al. |
| 6,360,133 B1 | 3/2002 | Campbell et al. |
| 6,360,184 B1 | 3/2002 | Jacquez |
| 6,363,294 B1 | 3/2002 | Coronel et al. |
| 6,366,934 B1 | 4/2002 | Cheng et al. |
| 6,368,879 B1 | 4/2002 | Toprac |
| 6,368,883 B1 | 4/2002 | Bode et al. |
| 6,368,884 B1 | 4/2002 | Goodwin et al. |
| 6,379,980 B1 | 4/2002 | Toprac |
| 6,381,564 B1 | 4/2002 | Davis et al. |
| 6,388,253 B1 | 5/2002 | Su |
| 6,389,491 B1 | 5/2002 | Jacobson et al. |
| 6,391,780 B1 | 5/2002 | Shih et al. |
| 6,395,152 B1 | 5/2002 | Wang |
| 6,397,114 B1 | 5/2002 | Eryurek et al. |
| 6,400,162 B1 | 6/2002 | Mallory et al. |
| 6,405,096 B1 | 6/2002 | Toprac et al. |
| 6,405,144 B1 | 6/2002 | Toprac et al. |
| 6,417,014 B1 | 7/2002 | Lam et al. |
| 6,427,093 B1 | 7/2002 | Toprac |
| 6,432,728 B1 | 8/2002 | Tai et al. |
| 6,435,952 B1 | 8/2002 | Boyd et al. |
| 6,438,438 B1 | 8/2002 | Takagi et al. |
| 6,440,295 B1 | 8/2002 | Wang |
| 6,442,496 B1 | 8/2002 | Pasadyn et al. |
| 6,449,524 B1 | 9/2002 | Miller et al. |
| 6,455,415 B1 | 9/2002 | Lopatin et al. |
| 6,455,937 B1 | 9/2002 | Cunningham |
| 6,465,263 B1 | 10/2002 | Coss, Jr. et al. |
| 6,470,230 B1 | 10/2002 | Toprac et al. |
| 6,479,902 B1 | 11/2002 | Lopatin et al. |
| 6,479,990 B2 | 11/2002 | Mednikov et al. |
| 6,482,660 B2 | 11/2002 | Conchieri et al. |
| 6,484,064 B1 | 11/2002 | Campbell |
| 6,486,492 B1 | 11/2002 | Su |
| 6,492,281 B1 | 12/2002 | Song et al. |
| 6,495,452 B1 | 12/2002 | Shih |
| 6,503,839 B2 | 1/2003 | Gonzales et al. |
| 6,515,368 B1 | 2/2003 | Lopatin et al. |
| 6,517,413 B1 | 2/2003 | Hu et al. |
| 6,517,414 B1 | 2/2003 | Tobin et al. |
| 6,528,409 B1 | 3/2003 | Lopatin et al. |
| 6,529,789 B1 | 3/2003 | Campbell et al. |
| 6,532,555 B1 | 3/2003 | Miller et al. |
| 6,535,783 B1 | 3/2003 | Miller et al. |
| 6,537,912 B1 | 3/2003 | Agarwal |
| 6,539,267 B1 | 3/2003 | Eryurek et al. |
| 6,540,591 B1 | 4/2003 | Pasadyn et al. |
| 6,541,401 B1 | 4/2003 | Herner et al. |

| | | | | | |
|---|---|---|---|---|---|
| 6,546,508 B1 | 4/2003 | Sonderman et al. | JP | 06-260380 | 9/1994 |
| 6,556,881 B1 | 4/2003 | Miller | JP | 8-23166 | 1/1996 |
| 6,556,959 B1 * | 4/2003 | Miller et al. ............ 703/2 | JP | 08-50161 | 2/1996 |
| 6,560,504 B1 | 5/2003 | Goodwin et al. | JP | 08-149583 | 6/1996 |
| 6,563,308 B2 | 5/2003 | Nagano et al. | JP | 08-304023 | 11/1996 |
| 6,567,717 B2 | 5/2003 | Krivokapic et al. | JP | 09-34535 | 2/1997 |
| 6,580,958 B1 | 6/2003 | Takano | JP | 9-246547 | 9/1997 |
| 6,587,744 B1 | 7/2003 | Stoddard et al. | JP | 10-34522 | 2/1998 |
| 6,590,179 B2 | 7/2003 | Tanaka et al. | JP | 10-173029 | 6/1998 |
| 6,604,012 B1 | 8/2003 | Cho et al. | JP | 11-67853 | 3/1999 |
| 6,605,549 B2 | 8/2003 | Leu et al. | JP | 11-126816 | 5/1999 |
| 6,607,976 B2 | 8/2003 | Chen et al. | JP | 11-135601 | 5/1999 |
| 6,609,946 B1 | 8/2003 | Tran | JP | 2000/-183001 | 6/2000 |
| 6,616,513 B1 | 9/2003 | Osterheld | JP | 2001-76982 | 3/2001 |
| 6,618,692 B2 | 9/2003 | Takahashi et al. | JP | 2001-284201 | * 10/2001 |
| 6,624,075 B1 | 9/2003 | Lopatin et al. | JP | 2001-284299 | 10/2001 |
| 6,625,497 B2 | 9/2003 | Fairbairn et al. | JP | 2001/-305108 | 10/2001 |
| 6,630,741 B1 | 10/2003 | Lopatin et al. | JP | 2002-9030 | 1/2002 |
| 6,640,151 B1 | 10/2003 | Somekh et al. | JP | 2002/-343754 | 11/2002 |
| 6,652,355 B2 | 11/2003 | Wiswesser et al. | TW | 434103 | 5/2001 |
| 6,660,633 B1 | 12/2003 | Lopatin et al. | TW | 436383 | 5/2001 |
| 6,678,570 B1 | 1/2004 | Pasadyn et al. | TW | 455938 | 9/2001 |
| 6,684,114 B1 | 1/2004 | Erickson et al. | TW | 455976 | 9/2001 |
| 6,687,558 B2 | 2/2004 | Tuszynski | WO | WO-95/3486/6 | 12/1995 |
| 6,708,074 B1 | 3/2004 | Chi et al. | WO | WO-98/0506/6 | 2/1998 |
| 6,708,075 B2 | 3/2004 | Sonderman et al. | WO | WO-98/4509/0 | 10/1998 |
| 6,725,402 B1 | 4/2004 | Coss, Jr. et al. | WO | WO-99/0937/1 | 2/1999 |
| 6,728,587 B2 | 4/2004 | Goldman et al. | WO | WO-99/2552/0 | 5/1999 |
| 6,735,492 B2 | 5/2004 | Conrad et al. | WO | WO-99/5920/0 | 11/1999 |
| 6,748,280 B1 | 6/2004 | Zou et al. | WO | WO-00/0087/4 | 1/2000 |
| 6,751,518 B1 | 6/2004 | Sonderman et al. | WO | WO-00/0575/9 | 2/2000 |
| 6,766,214 B1 | 7/2004 | Wang et al. | WO | WO-00/3506/3 | 6/2000 |
| 6,774,998 B1 | 8/2004 | Wright et al. | WO | WO-00/5432/5 | 9/2000 |
| 6,961,626 B1 * | 11/2005 | Paik ............ 700/31 | WO | WO-00/7935/5 | 12/2000 |
| 7,096,085 B2 * | 8/2006 | Paik ............ 700/108 | WO | WO-01/1167/9 | 2/2001 |
| 2003/0065409 A1 * | 4/2003 | Raeth et al. ............ 700/31 | WO | WO-01/1586/5 | 3/2001 |
| 2004/0107895 A1 | 6/2004 | Takahashi et al. | WO | WO-01/1862/5 | 3/2001 |
| 2004/0267395 A1 | 12/2004 | Discenzo et al. | WO | WO-01/2586/5 | 4/2001 |
| | | | WO | WO-01/3327/7 | 5/2001 |
| | | FOREIGN PATENT DOCUMENTS | WO | WO-01/3350/1 | 5/2001 |
| | | | WO | WO-01/5205/5 | 7/2001 |
| CA | 2165847 | 8/1991 | WO | WO-01/5231/9 | 7/2001 |
| CA | 2194855 | 8/1991 | WO | WO-01/5782/3 | 8/2001 |
| EP | 0 397 924 | 11/1990 | WO | WO-01/8030/6 | 10/2001 |
| EP | 0 621 522 | 10/1994 | WO | WO-02/1715/0 | 2/2002 |
| EP | 0 747 795 | 12/1996 | WO | WO-02/3161/3 | 4/2002 |
| EP | 0 869 652 | 10/1998 | WO | WO-02/3373/7 | 4/2002 |
| EP | 0 877 308 | 11/1998 | WO | WO-02/074491 | 9/2002 |
| EP | 0 881 040 | 12/1998 | | | |
| EP | 0 895 145 | 2/1999 | | | |
| EP | 0 910 123 | 4/1999 | | | |
| EP | 0 932 194 | 7/1999 | | | |
| EP | 0 932 195 | 7/1999 | | | |
| EP | 1 066 925 | 1/2001 | | | |
| EP | 1 067 757 | 1/2001 | | | |
| EP | 1 071 128 | 1/2001 | | | |
| EP | 1 083 470 | 3/2001 | | | |
| EP | 1 092 505 | 4/2001 | | | |
| EP | 1 072 967 | 11/2001 | | | |
| EP | 1 182 526 | 2/2002 | | | |
| GB | 2 347 885 | 9/2000 | | | |
| GB | 2 365 215 | 2/2002 | | | |
| JP | 61-66104 | 4/1986 | | | |
| JP | 61-171147 | 8/1986 | | | |
| JP | 01-283934 | 11/1989 | | | |
| JP | 3-202710 | 9/1991 | | | |
| JP | 05-151231 | 6/1993 | | | |
| JP | 05-216896 | 8/1993 | | | |
| JP | 05-266029 | 10/1993 | | | |
| JP | 06-110894 | 4/1994 | | | |
| JP | 06-176994 | 6/1994 | | | |
| JP | 06-184434 | 7/1994 | | | |
| JP | 06-252236 | 9/1994 | | | |

OTHER PUBLICATIONS

2000. "Microsense II Capacitance Gaging System," www.adetech.com.
2002. "Microsense II—5810: Non-Contact Capacitance Gaging Module." www.adetech.com.
"3D optical profilometer MicroXAM by ADE Phase Shift." Printed Dec. 9, 2003. http://www.phase-shift.com/microxam.shtml.
ACM Research Inc. 2000. "Advanced Copper Metallization for 0.13 to 0.05 & Beyond." http://acmrc.com/press/ACM-ECP-brochure.
ACM Research, Inc. 2002. "ACM Ultra ECP System: Electro-Copper Plating (ECP) Deposition." www.acmrc.com/ecp.html.
Adams, Bret W., Bogdan Swedek, Rajeev Bajaj, Fritz Redeker, Manush Birang, and Gregory Amico. "Full-Wafer Endpoint Detection Improves Process Control in Copper CMP." Semiconductor Fabtech 12th Edition. Applied Materials, Inc., Santa Clara, CA.
"ADE Technologies, Inc. 6360." Printed Dec. 9, 2003. http://www.adetech.com/6360.shtml.
Applied Materials, Inc. 2002. "Applied Materials: Information for Everyone: Copper Electrochemical Plating." www.appliedmaterials.com/products/copper_plating.html.
Apr. 22, 2004. Office Action for U.S. Appl. No. 09/998,372, filed Nov. 30, 2001.

Apr. 28, 2004. Written Opinion for PCT/US02/19117.
Apr. 29, 2004. Written Opinion for PCT/US02/19061.
Apr. 9, 2003. Office Action for U.S. Appl. No. 09/928,474, filed Aug. 14, 2001.
Apr. 9, 2004. Written Opinion for PCT/US02/19116.
Aug. 1, 2003. Written Opinion for PCT/US01/27406.
Aug. 18, 2004. International Preliminary Examination Report for PCT Serial No. PCT/US02/19116.
Aug. 2, 2004. Office Action for U.S. Appl. No. 10/174,377, filed Jun. 18, 2002.
Aug. 20, 2003. Written Opinion for PCT/US01/22833.
Aug. 24, 2004. Office Action for U.S. Appl. No. 10/135,405, filed May 1, 2002.
Aug. 25, 2003. Office Action for U.S. Appl. No. 10/100,184, filed Mar. 19, 2002.
Aug. 25, 2004. Office Action for U.S. Appl. No. 09/998,384, filed Nov. 30, 2001.
Aug. 8, 2003. PCT International Search Report from PCT/US03/08513.
Aug. 9, 2004. Written Opinion for PCT Serial No. PCT/US02/19063.
Baliga, John. Jul. 1999. "Advanced Process Control: Soon to be a Must." Cahners Semiconductor International. www.semiconductor.net/semiconductor/issues/issues/1999/jul99/docs/feature1.asp.
Berman, Mike, Thomas Bibby, and Alan Smith. "Review of In Situ & In-line Detection for CMP Applications." Semiconductor Fabtech, 8th Edition, pp. 267-274.
Boning, Duane S., Jerry Stefani, and Stephanie W. Butler. Feb. 1999. "Statistical Methods for Semiconductor Manufacturing." Encyclopedia of Electrical Engineering, J. G. Webster, Ed.
Boning, Duane S., William P. Moyne, Taber H. Smith, James Moyne, Ronald Telfeyan, Amon Hurwitz, Scott Shellman, and John Taylor. Oct. 1996. "Run by Run Control of Chemical-Mechanical Polishing." IEEE Transactions and Components, Packaging, and Manufacturing Technology, Part C, vol. 19, No. 4, pp. 307-314.
Burke, Peter A. Jun. 1991, "Semi-Empirical Modelling of SiO2 Chemical-Mechanical Polishing Planarization." VMIC Conference, 1991 IEEE, pp. 379-384. IEEE.
Campbell, W. J., S. K. Firth, A. J. Toprac, and T. F. Edgar. May 2002. "A Comparison of Run-to-Run Control Algorithms (Abstract)." Proceedings of 2002 American Control Conference, vol. 3, pp. 2105-2155.
Campbell, W. Jarrett, and Anthony J. Toprac. Feb. 11-12, 1998. "Run-to-Run Control in Microelectronics Manufacturing." Advanced Micro Devises, TWMCC.
Chang, E., B. Stine, T. Maung, R. Divecha, D. Boning, J. Chung, K. Chang, G. Ray, D. Bradbury, O. S. Nakagawa, S. Oh, and D. Bartelink. Dec. 1995. "Using a Statistical Metrology Framework to Identify Systemic and Random Sources of Die- and Wafer-level ILD Thickness Variation in CMP Processes." Washington, D.C.: International Electron Devices Meeting.
Chang, Norman H. and Costas J. Spanos. Feb. 1991. "Continuous Equipment Diagnosis Using Evidence Integration: An LPCVD Application." IEEE Transactions on Semiconductor Manufacturing, v. 4, n. 1 pp. 43-51.
Chemali, Chadi El, James Moyne, Kareemullah Khan, Rock Nadeau, Paul Smith, John Colt, Jonathan Chapple-Sokol, and Tarun Parikh. Jul./Aug. 2000. "Multizone Uniformity Control of a Chemical Mechanical Polishing Process Utilizing a Pre- and Postmeasurement Strategy." J. Vac. Sci. Technol. A, vol. 18(4). pp. 1287-1296. American Vacuum Society.
Chemali, Chai El, James Moyne, Kareemullah Khan, Rock Nadeau, Paul Smith, John Colt, Jonathan Chapple-Sokol, and Tarum Parikh. Nov. 1998. "Multizone Uniformity Control of a CMP Process Utilizing a Pre and Post-Measurement Strategy." Seattle, Washington: SEMETECH Symposium.
Chen, Argon and Ruey-Shan Guo. Feb. 2001. "Age-Based Double EWMA Controller and its Application to CMP Processes." IEEE Transactions on Semiconductor Manufacturing, vol. 14, No. 1, pp. 11-19.
Cheung, Robin. Oct. 18, 2000. "Copper Interconnect Technology." AVS/CMP User Group Meeting, Santa Clara, CA.
Consilium Corporate Brochure. Oct. 1999. www.consilium.com.
Consilium. 1998. FAB300. Mountain View, California: Consilium, Inc.
Consilium. Aug. 1998. Quality Management Component: and QMC Overview. Mountain View, California: Consilium, Inc.
Consilium. Jan. 1999. "FAB300: Consilium's Next Generation MES Solution of Software and Services which Control and Automate Real-Time FAB Operations." www.consilium.com/products/fab300_page.htm#FAB300 Introduction.
Consilium. Jul. 1999. "Increasing Overall Equipment Effectiveness (OEE) in Fab Manufacturing by Implementing Consilium's Next-Generating Manufacturing Execution System —MES II." Semiconductor Fabtech Edition 10.
Consilium. Nov. 1999. FAB300 Update.
Cunninhgham, James A. 2003. "Using Electrochemisty to Improve Copper Interconnects." http://www.e-insite.net/semiconductor/.
Dec. 1, 2003. Office Action for U.S. Appl. No. 10/173,108, filed Jun. 2002.
Dec. 11, 2003. Office Action for U.S. Appl. No. 09/943,383, Aug. 31, 2001.
Dec. 16, 2003. International Search Report for PCT/US03/23964.
Dec. 17, 2002. Office Action for U.S. Appl. No. 09/363,966, filed Jul. 29, 1999.
Dishon, G., D. Eylon, M. Finarov, and A. Shulman. "Dielectric CMP Advanced Process Control Based on Integrated Monitoring." Ltd. Rehoveth, Israel: Nova Measuring Instruments.
Dishon, G., M. Finarov, R. Kipper, J.W. Curry, T. Schraub, D. Trojan, Stambaugh, Y. Li and J. Ben-Jacob. Feb. 1996. "On-Line Integrated Metrology for CMP Processing." Santa Clara, California: VMIC Speciality Conferences, International CMP Planarization Conference.
Durham, Jim and Myriam Roussel. 1997. "A Statistical Method for Correlating In-Line Defectivity to Probe Yield." IEEE/SEMI Advanced Semiconductor Manufacturing Conference, pp. 76-77.
Edgar, T. F., W. J. Campbell, and C. Bode. Dec. 1999. "Model-Based Control in Microelectronics Manufacturing." Proceedings of the 38$^{th}$ IEEE Conference on Decision and Control, Pheonix, Arizona, vol. 4, pp. 4185-4191.
Edgar, Thomas F., Stephanie W. Butler, Jarrett Campbell, Carlos Pfieffer, Chris Bode, Snug Bo Hwang, and K.S. Balakrishnan. May 1998. "Automatic Control in Microelectronics Manufacturing: Practices, Challenges, and Possibilities." Automatica, vol. 36, pp. 1567-1603, 2000.
Edgar, Thomas F., Stephanie W. Butler, W. Jarrett Campbell. Carlos Pfeiffer, Christopher Bode, Sung Bo Hwang, K. S. Balakrishnan, and J. Hahn. Nov. 2000. "Automatic Control in Microelectronics Manufacturing: Practices, Challenges, and Possibilities (Abstract)." Automatica, v. 36, n. 11.
Eisenbraun, Eric, Oscar van der Straten, Yu Zhu, Katharine Dovidenko, and Alain Kaloyeros. 2001. "Atomic Layer Deposition (ALD) of Tantalum-Based Materials for Zero Thickness Copper Barrier Applications" (Abstract). IEEE pp. 207-209.
Elers, Kai-Erik, Ville Saanila, Pekka J. Soininen, Wei-Min Li, Juhana T. Kostamo, Suvi Haukka, Jyrki Juhanoja, and Wim F.A. Besling. 2002. "Diffusion Barrier Deposition on a Copper Surface by Atomic Layer Deposition" (Abstract). Advanced Materials vol. 14, No. 13-14, pp. 149-153.
Fan, Jr-Min, Ruey-Shan Guo, Shi-Chung Chang, and Kian-Huei Lee. 1996. "Abnormal Trend Detection of Sequence-Disordered Data Using EWMA Method." IEEE/SEMI Advanced Semiconductor Manufacturing Conference, pp. 169-174.
Fang, S. J., A. Barda, T. Janecko, W. Little, D. Outley, Hempel, S. Joshi, B. Morrison, G. B. Shinn, and M. Birang. 1998. "Control of Dielectric Chemical Mechanical Polishing (CMP) Using and Interferometry Based Endpoint Sensor." International Proceedings of the IEEE Interconnect Technology Conference, pp. 76-78.
Feb. 10, 2003. Office Action for U.S. Appl. No. 09/619,044, filed Jul. 19, 2000.
Feb. 1984. " Method and Apparatus of in Situ Measurement and Overlay Error Analysis for Correcting Step and Repeat Lithographic Cameras." IBM Technical Disclosure Bulletin, pp. 4855-4859.
Feb. 1984. "Substrate Screening Process." IBM Technical Disclosure Bulletin, pp. 4824-4825.

Feb. 1993, "Electroless Plating Scheme to Hermetically Seal Copper Features." IBM Technical Disclosure Bulletin. pp. 405-406.

Feb. 2, 2004. Office Action for U.S. Appl. No. 09/363,966, filed Jul. 29, 1999.

Good, Richard and S. Joe Qin. May 2002. "Stability Analysis of Double EWMA Run-to-Run Control with Metrology Delay." IEEE/CPMT International Electronics Manufacturing Technology Symposium, pp. 355-363.

Guo, R.S, A. Chen, C.L. Tseng, I.K. Fong, A. Yang, C.L. Lee, C.H. Wu, S. Lin, S.J. Huang, Y.C. Lee, S.G. Chang, and M.Y. Lee. Jun. 16-17, 1998. "A Real-Time Equipment Monitoring and Fault Detection System." Semiconductor Manufacturing Workshop, pp. 111-121.

Guo, Ruey-Shan, Li-Shia Huang, Argon Chen, and Jin-Jung Chen. Oct. 1997. "A Cost-Effective Methodology for a Run-by-Run EWMA Controller." 6th International Symposium on Semiconductor Manufacturing, pp. 61-64.

Hermann, D. 1988. "Temperature Errors and Ways of Elimination for Contactless Measurement of Shaft Vibrations (Abstract)." Technisches, vol. 55, No. 1, pp. 27-30. West Germany.

Heuberger, U. Sep. 2001. "Coating Thickness Measurement with Dual-Function Eddy-Current & Magnetic Inductance Instrument (Abstract)." Galvanotechnik, vol. 92, No. 9, pp. 2354-2366.

Hu, Albert, He Du, Steve Wong, Peter Rentein, and Emmanual Sachs. 1994. "Application of Run by Run Controller to the Chemical-Mechanical Planarization Process." IEEE/CPMT Internationanl Electronics Manufacturing Technology Symposium, pp. 371-378.

Hu, Albert, Kevin Nguyen, Steve Wong, Xiuhua Zhang, Emanuel Sachs, and Peter Renteln. 1993. "Concurrent Deployment of Run by Run Controller Using SCC Framework." IEEE/SEMI International Semiconductor Manufacturing Science Symposium. pp. 126-132.

Islam Raja, M. M., C. Chang, J. P. McVittie, M. A. Cappelli, and K. C. Saraswat. May/Jun. 1993. "Two Precursor Model for Low-Pressure Chemical Vapor Deposition of Silicon Dioxide from Tetraethylorthosilicate." J. Vac. Sci. Technol. B, vol. 11, No. 3, pp. 720-726.

Itabashi, Takeyuki, Hiroshi Nakano, and Haruo Akahoshi. Jun. 2002. "Electroless Deposited CoWB for Copper Diffusion Barrier Metal." IEEE International Interconnect Technology Conference, pp. 285-287.

Jan. 20, 2004. Office Action for U.S. Appl. No. 09/927,444, filed Aug. 13, 2001.

Jan. 23, 2004. International Search Report for PCT/US02/24860.

Jensen, Alan, Peter Renteln, Stephen Jew, Chris Raeder, and Patrick Cheung. Jun. 2001. "Empirical-Based Modeling for Control of CMP Removal Uniformity." Solid State Technology, vol. 44, No. 6, pp. 101-102, 104, 106. Cowan Publ. Corp.: Washington, D.C.

Johnson, Bob. Jun. 10, 2002. "Advanced Process Control Key to Moore's Law." Gartner, Inc.

Jul. 12, 2004. Office Action for U.S. Appl. No. 10/173,108, filed Jun. 8, 2002.

Jul. 15, 2004. Office Action for U.S. Appl. No. 10/172,977, filed Jun. 18, 2002.

Jul. 1998. "Active Controller: Utilizing Active Databases for Implementing Multistop Control of Semiconductor Manufacturing (Abstract)." IEEE Transactions on Components, Packaging and Manufacturing Technology—Part C, vol. 21, No. 3, pp. 217-224.

Jul. 23, 2002. Communication Pursuant to Article 96(2) EPC for European Patent Application No. 00 115 577.9.

Jul. 23, 2003. Invitation to Pay Additional Fees and Communication Relating to the Results of the Partial International Search for PCT/US02/19116.

Jul. 25, 2003. International Search Report for PCT/US02/24858.

Jul. 29, 2002. International Search Report for PCT/US01/27407.

Jul. 5, 2001. "Motorola and Advanced Micro Devices Buy ObjectSpace Catalyst Advanced Process Control Product for Five Wafer Fabs." Semiconductor FABTECH. www.semiconductorfabtech.com/industry.news/9907/20.07.shtml.

Jul. 9, 2002. International Search Report for PCT/US01/24910.

Jun. 18, 2003. Office Action for U.S. Appl. No. 09/655,542, filed Sep. 6, 2000.

Jun. 20, 2002. Office Action for U.S. Appl. No. 09/619,044, filed Jul. 19, 2000.

Jun. 23, 2004. Office Action for U.S. Appl. No. 10/686,589, filed Oct. 17, 2003.

Jun. 3, 2004. Office Action for U.S. Appl. No. 09/928,474, filed Aug. 14, 2001.

Jun. 30, 2004. Office Action for U.S. Appl. No. 09/800,980, filed Mar. 8, 2001.

Khan, K., C. El Chemali, J. Moyne, J. Chapple-Sokol, R. Nadeau, P. Smith, C., and T. Parikh. Oct. 1999. "Yield Improvement at the Contact Process Through Run-to-Run Control (Abstract)." 24th IEEE/CPMT Electronics Manufacturing Technology Symposium, pp. 258-263.

Khan, Kareemullah, Victor Solakhain, Anthony Ricci, Tier Gu, and James Moyne. 1998. "Run-to-Run Control of ITO Deposition Process." Ann Arbor, Michigan.

Khan, S., M. Musavi, and H. Ressom. Nov. 2000. "Critical Dimension Control in Semiconductor Manufacturing (Abstract)." ANNIE 2000. Smart Engineering Systems Design Conference, pp. 995-1000. St. Louis. Missouri.

Kim, Eui Jung and William N. Gill. Jul. 1994. "Analytical Model for Chemical Vapor Deposition of SiO2 Films Using Tetraethoxysliane and Ozone" (Abstract). Journal of Crystal Growth, vol. 140, Issues 3-4, pp. 315-326.

Kim, Y.T. and H. Sim. 2002. "Characteristics of Pulse Plasma Enhanced Atomic Layer Deposition of Tungsten Nitride Diffusion Barrier for Copper Interconnect" (Abstract). IEIC Technical Report. vol. 102, No. 178, pp. 115-118.

KLA-Tencor Corporation. 2002. "KLA Tencor: Press Release: KLA-Tencor Introduces First Production-Worthy Copper CMP In-Situ Film Thickness and End-point Control System: Multi-Million Dollar Order Shipped to Major CMP Tool Manufacturer." www.kia-tencor.com/news_events/press_releases/press_releases2001/984086002.html.

Klein, Bruce. Jun. 1999. "Application Development: XML Makes Object Models More Useful." Informationweek. pp. 1A-6A.

Kurtzberg, Jerome M. and Menachem Levanoni, Jan. 1994. "ABC: A Better Control for Manufacturing." IBM Journal of Research and Development, v. 38, n. 1, pp. 11-30.

Lantz, Mikkel. 1999. "Equipment and APC Integration at AMD with Workstream." IEEE, pp. 325-327.

Larrabee, G. B. May 1991. "The Intelligent Microelectronics Factory of the Future (Abstract)." IEEE/SEMI International Semiconductor Manufacturing Science Symposium, pp. 30-34. Burlingame, CA.

Leang, Sovarong, Shang-Yi Ma, John Thomson, Bart John Bombay, and Costas J. Spanos. May 1996. "A Control System for Photolighographic Sequences." IEEE Transactions on Semiconductor Manufacturing, vol. 9, No. 2.

Lee, Brian, Duane S. Boning, Winthrop Baylies, Noel Poduje, Pat Hester, Yong Xia, John Valley, Chris Koliopoulus, Dale Hetherington, HongJiang Sun, and Michael Lacy. Apr. 2001. "Wafer Nanotopography Effects on CMP: Experimental Validation of Modeling Methods." San Francisco, California: Materials Research Society Spring Meeting.

Levine, Martin D. 1985. Vision in Man and Machine. New York: McGraw-Hill, Inc. pp. ix-xii, 1-58.

Lin, Kuang-Kuo and Costas J. Spanos. Nov. 1990. "Statistical Equipment Modeling for VLSI Manufacturing: An Application for LPCVD." IEEE Transactions on Semiconductor Manufacturing, v. 3, n. 4, pp. 216-229.

Mar. 15, 2002. Office Action for U.S. Appl. No. 09/469,227, filed Dec. 22, 1999.

Mar. 25, 2003. International Search Report for PCT/US02/24859.

Mar. 29, 2002. Office Action for U.S. Appl. No. 09/363,966, filed Jul. 29, 1999.

Mar. 30, 2004. Written Opinion for PCT/US02/19062.

Mar. 5, 2001. "KLA-Tencor Introduces First Production-worthy Copper CMP In-situ Film Thickness and End-point Control System." http://www.kla-tencor.com.

Matsuyama, Akira and Jessi Niou. 1993. "A State-of-the-Art Automation System of an ASIC Wafer Fab in Japan." IEEE/SEMI International Semiconductor Manufacturing Science Symposium, pp. 42-47.

May 1992. "Lawer Ablation Endpoint Detector." IBM Technical Disclosure Bulletin, pp. 333-334.

May 23, 2003. Written Opinion for PCT/US01/24910.

May 28, 2004. Office Action for U.S. Appl. No. 09/943,383, filed Aug. 31, 2001.

May 5, 2004. International Preliminary Examination Report for PCT/US01/27406.

May 5, 2004. Office Action for U.S. Appl. No. 09/943,955, filed Aug. 31, 2001.

May 8, 2003. Office Action for U.S. Appl. No. 09/637,620, filed Aug. 11, 2000.

McIntosh, John. Mar. 1999. "Using CD-SEM Metrology in the Manufacture of Semiconductors (Abstract)." JOM, vol. 51, No. 3, pp. 38-39.

Meckl, P. H. and K. Umemoto. Apr. 2000. "Achieving Fast Motions by Using Shaped Reference Inputs [Semiconductor Manufacturing Machine] (Abstract)." NEC Research and Development, vol. 41, No. 2, pp. 232-237.

Meckl, P.H. and K. Umemoto. Aug. 1999. "Achieving Fast Motions in Semiconductor Manufacturing Machinery (Abstract)." Proceedings of the 1999 IEEE International Conference on Control Applications, vol. 1, pp. 725-729, Kohala Coast, HI.

Miller, G. L., D. A. H. Robinson, and J. D. Wiley. Jul. 1976. "Contactless measurement of semiconductor conductivity by radio frequency-free-carrier power absorption." Rev. Sci. Instrum., vol. 47, No. 7. pp. 799-805.

Moyne, J., V. Solakhian, A. Yershov, M. Anderson, and D. Mockler-Herbert. Apr.-May 2002. "Development and Deployment of a Multi-Component Advanced Process Control System for an Epitaxy Tool (Abstract)." 2002 IEEE Advanced Semiconductor Manufacturing Conference and Workshop, pp. 125-130.

Moyne, James R., Nauman Chaudhry, and Roland Telfeyan. 1995. "Adaptive Extensions to a Multi-Branch Run-to-Run Controller for Plasma Etching." Journal of Vacuum Science and Technology. Ann Arbor, Michigan: University of Michigan Display Technology Manufacturing Center.

Moyne, James, and John Curry. Jun. 1998. "A Fully Automated Chemical-Mechanical Planarization Process." Santa Clara, California: VLSI Multilevel Interconnection (V-MIC) Conference.

Moyne, James, Roland Telfeyan, Arnon Hurwitz, and John Taylor. Aug. 1995. "A Process-Independent Run-to-Run Controller and Its Application to Chemical-Mechanical Planarization." SEMI/IEEE Advanced Semiconductor Manufacturing Conference and Workshop. Ann Arbor, Michigan: The University of Michigan, Electrical Engineering & Computer Science Center for Display Technology & Manufacturing.

Moyne, James. Oct. 1999. "Advancements in CMP Process Automation and Control." Hawaii: (Invited paper and presentation to) Third International Symposium on Chemical Mechanical Polishing in IC Device Manufacturing: 196th Meeting of the Electrochemical Society.

Mozumder, Pumendu K. and Gabriel G. Barna. Feb. 1994. "Statistical Feedback Control of a Plasma Etch Process." IEEE Transactions on Semiconductor Manufacturing, v. 7, n. 1, pp. 1-11.

Muller-Heinzerling, Thomas, Ulrich Neu, Hans Georg Numberg, and Wolfgang May. Mar. 1994. "Recipe-Controlled Operation of Batch Processes with Batch X." ATP Automatisierungstechnische Praxis, vol. 36, No. 3, pp.43-51.

Mullins, J. A., W. J. Campbell, and A. D. Stock. Oct. 1997. "An Evaluation of Model Predictive Control in Run-to-Run Processing in Semiconductor Manufacturing (Abstract)." Proceedings of the SPIE;The International Society for Optical Engineering Conference, vol. 3213, pp. 182-189.

"NanoMapper FA factory automation wafer nanotopography measurement." Printed Dec. 9, 2003. http://www.phase-shift.com/nanomapperfa.shtml.

"NanoMapper wafer nanotopography measurement by ADE Phase Shift." Printed Dec. 9, 2003. http://www.phase-shift.com/nanomap.shtml.

Nov. 11, 2002. International Search Report for PCT/US02/19117.

Nov. 12, 2002. International Search Report for PCT/US02/19063.

Nov. 17, 2004. Written Opinion for PCT Serial No. PCT/US01/27407.

Nov. 1999. "How to Use EWMA to Achieve SPC and EPC Control." International Symposium on NDT Contribution to the Infrastructure Safety Systems, Tores, Brazil. http://www.ndt/abstract/ndtiss99/data/35.

Nov. 5, 2003. Office Action for U.S. Appl. No. 10/172,977, filed Jun. 18, 2002.

Nov. 7, 2002. International Search Report for PCT/US02/19061.

NovaScan 2020. Feb. 2002. "Superior Integrated Process Control for Emerging CMP High-End Applications."

Oct. 1, 2004. International Preliminary Examination Report for PCT Serial No. PCT/US03/23964.

Oct. 12, 2004. International Preliminary Examination Report for PCT Serial No. PCT/US02/19061.

Oct. 14, 2003. PCT International Search Report from PCT/US02/21942.

Oct. 15, 2001. Search Report prepared by the Austrian Patent Office for Singapore Patent Application No. 200004286-1.

Oct. 15, 2002. International Search Report for PCT/US02/19062.

Oct. 1984. "Method to Characterize the Stability of a Step and Repeat Lighographic System." IBM Technical Disclosure Bulletin, pp. 2857-2860.

Oct. 20, 2003. PCT International Search Report from PCT/US02/19116.

Oct. 23, 2002. International Search Report for PCT/US01/27406.

Oct. 23, 2002. Office Action for U.S. App. No. 09/469,227, filed Dec. 22, 1999.

Oct. 23, 2003. PCT International Preliminary Examination Report from PCT/US01/24910.

Oct. 4, 2002. International Search Report for PCT/US01/22833.

Oct. 6, 2004. Office Action for U.S. Appl. No. 10/759,108, filed Jan. 20, 2004.

Oechsner, R., T. Tschaftary, S. Sommer, L. Pfitzner, H. Ryssel, H. Gerath, C. Baier, and M. Hafner. Sep. 2000. "Feed-forward Control for a Lithography/Etch Sequence (Abstract)." Proceedings of the SPIE—The International Society for Optical Engineering Conference, vol. 4182, pp. 31-39.

Ostanin, Yu.Ya. Oct. 1981. "Optimization of Thickness Inspection of Electrically Conductive Single-Layer Coatings with Laid-on Eddy-Current Transducers (Abstract)." Defektoskopiya, vol. 17, No. 10, pp. 45-52. Moscow, USSR.

Ouma, Dennis, Duane Boning, James Chung, Greg Shinn, Leif Olsen, and John Clark. 1998. "An Integrated Characterization and Modeling Methodology for CMP Dielectric Planarization." Proceedings of the IEEE 1998 International Interconnect Technology Conference, pp. 67-69.

Pan, J. Tony, Ping Li, Kapola Wijekoon, Stan Tsai, and Fritz Redeker, May 1999. "Copper CMP Integration and Time Dependent Pattern Effect." IEEE 1999 International Interconnect Technology Conference, pp. 164-166.

Peng, C.H., C.H. Hsieh, C.L. Huang, J.C. Lin, M.H. Tsai, M.W. Lin, C.L. Chang, Winston S. Shue, and M.S. Liang. 2002. "A 90nm Generation Copper Dual Damascene Technology with ALD TaN Barrier." IEEE pp. 603-606.

Pilu, Maurizio. Sep. 2001. "Undoing Page Curl Distortion Using Applicable Surfaces." IEEE International Conference on Image Processing. Thessalonica, Greece.

Rampalli, Prasad, Arakere Ramesh, and Nimish Shah. 1991. CEPT—A Computer-Aided Manufacturing Application for Managing Equipment Reliability and Availability in the Semiconductor Industry. New York, New York: IEEE.

Ravid, Avi, Avner Sharon, Amit Weingarten, Vladimir Machavariani, and David Scheiner, 2000. "Copper CMP Planarity Control Using ITM." IEEE/SEMI Advanced Semiconductor Manufacturing Conference, pp. 437-443.

Reitman, E. A., D. J. Friedman, and E. R. Lory. Nov. 1997. "Pre-Production Results Demonstrating Multiple-System Models for Yield Analysis (Abstract)." IEEE Transactions on Semiconductor Manufacturing, vol. 10, No. 4, pp. 469-481.

Rocha, Joao and Carlow Ramos. Sep. 12, 1994. "Task Planning for Flexible and Agile Manufacturing Systems." Intelligent Robots and Systems '94. Advanced Robotic Systems and the Real World, IROS '94. Proceedings of the IEEE/RSJ/GI International Conference on Munich, Germany Sep. 12-16, 1994. New York, New York: IEEE. pp. 105-112.

Ruegsegger, Steven, Aaron Wagner, James S. Freudenberg, and Dennis S. Grimard. Nov. 1999. "Feedforward Control for Reduced Run-to-Run Variation in Microelectronics Manufacturing." IEEE Transactions on Semiconductor Manufacturing, vol. 12, No. 4.

Runyan, W. R., and K. E. Bean. 1990. "Semiconductor Integrated Circuit Processing Technology." p. 48. Reading, Massachusetts: Addison-Wesley Publishing Company.

Sarfaty, Moshe, Arulkumar Shanmugasundram, Alexander Schwarm, Joseph Paik, Jimin Zhang, Rong Pan, Martin J. Seamons, Howard Li, Raymond Hung, and Suketu Parikh, Apr.-May 2002. "Advance Process Control Solutions for Semiconductor Manufacturing." Boston, Massachusetts: 13th Annual IEEE/SEMI Advanced Semiconductor Manufacturing Conference. Advancing the Science and Technology of Semiconductor Manufacturing. ASMC 2002, pp. 101-106.

Scarr, J. M. and J. K. Zelisse. Apr. 1993. "New Topology for Thickness Monitoring Eddy Current Sensors (Abstract)." Proceedings of the 36th Annual Technical Conference, Dallas, Texas.

Schaper, C. D., M. M. Moslehi, K. C. Saraswat, and T. Kailath. Nov. 1994. "Modeling, Identification, and Control of Rapid Thermal Processing Systems (Abstract)." Journal of the Electrochemical Society, vol. 141, No. 11, pp. 3200-3209.

Schmid, Hans Albrecht. 1995. "Creating the Architecture of a Manufacturing Framework by Design Patterns." Austin, Texas: OOPSLA.

SEMI. 2000. "Provisional Specification for CIM Framework Scheduling Components." San Jose, California. SEMI E105-1000.

SEMI. [1986] 1996. "Standard for Definition and Measurement of Equipment Reliability, Availability, and Mantainability (RAM)." SEMI E10-96.

SEMI. Jul. 1998. New Standard: Provisional Specification for CIM Framework Domain Architecture. Mountain View, California: SEMI Standards. SEMI Draft Doc. 2817.

"Semiconductor Manufacturing: An Overview." http://users.ece.gatech.edu/2dc;gmay/overview.html.

Sep. 15, 2003. Office Action for U.S. Appl. No. 09/928,474, filed Aug. 14, 2001.

Sep. 15, 2004. Office Action for U.S. Appl. No. 10/632,107, filed Aug. 1, 2003.

Sep. 16, 2004. International Preliminary Examination Report for PCT Serial No. PCT/US02/24859.

Sep. 26, 2002. Office Action for U.S. Appl. No. 09/637,620, filed Aug. 11, 2000.

Sep. 29, 2004. Office Action for U.S. Appl. No. 09/363,966, filed Jul. 29, 1999.

Sep. 9, 2004. Written Opinion for PCT Serial No. PCT/US02/21942.

Shindo, Wataru, Eric H. Wang, Ram Akella, and Andrzej J. Strojwas. 1997. "Excursion Detection and Source Isolation in Defect Inspection and Classification." 2nd International Workshop on Statistical Metrology, pp. 90-93.

Smith, S.R., K.E. Elers, T. Jacobs, V. Blaschke, and K. Pfeifer, 2001. "Physical and Electrical Characterization of ALD Tin Used as a Copper Diffusion Barrier in 0.25 mum, Dual Damascene Backened Structures" (Abstract). Advanced Metallization Conference 2001. Montreal, Quebec.

Smith, Stewart, Anthony J. Walton, Alan W. S. Ross, Georg K. H. Bodammer, and J. T. M. Stevenson. May 2002. "Evaluation of Sheet Resistance and Electrical Linewidth Measurement Techniques for Copper Damascene Interconnect." IEEE Transactions on Semiconductor Manufacturing, vol. 15, No. 2, pp. 214-222.

Smith, Taber and Duane Boning. 1996. "A Self-Tuning EWMA Controller Utilizing Artificial Neural Network Function Approximation Techniques." IEEE/CPMT International Electronics Manufacturing Technology Symposium, pp. 355-363.

Smith, Taber, Duane Bonig, James Moyne, Arnon Hurwitz, and John Curry, Jun. 1996. "Compensating for CMP Pad Wear Using Run by Run Feedback, Control." Santa Clara, California: Proceedings of the Thirteenth International VLSI Multilevel Interconnection Conference. pp. 437-439.

Sonderman, Thomas. 2002. "APC as a Competitive Manufacturing Technology: AMD's Vision for 300nm." AEC/APC.

Spanos, C. J., S. Leang, S.-Y. Ma, J. Thomson, B. Bombay, and X. Niu. May 1995. "A Multistep Supervisory Controller for Photolithographic Operations (Abstract)." Proceedings of the Symposium on Process Control, Diagnostics, and Modeling in Semiconductor Manufacturing, pp. 3-17.

Spanos, Costas J., Hai-Fang Guo, Alan Miller, and Joanne Levine-Parrill. Nov. 1992. "Real-Time Statistical Process Control Using Tool Data." IEEE Transactions on Semiconductor Manufacturing, v. 5, n. 4, pp. 308-318.

Stoddard, K., P. Crouch, M. Kozicki, and K. Taskalis, Jun.-Jul. 1994, "Application of Feedforward and Adaptive Feedback Control to Semiconductor Device Manufacturing (Abstract)." Proceedings of 1994 American Control Conference—ACC '94, vol. 1, pp. 892-896. Baltimore, Maryland.

Sun, S.C. 1998. "CVD and PVD Transition Metal Nitrides as Diffusion Barriers for Cu Metallization." IEEE pp. 243-246.

Suzuki, Junichi and Yoshikazu Yamamoto. 1998. "Toward the Interoperable Software Design Models: Quartet of UML, XML, DOM and COBRA." Proceedings IEEE International Software Engineering Standards Symposium. pp. 1-10.

Tagami, M., A. Furuya, T. Onodera, and Y. Hayashi. 1999. "Layered Ta-nitrides (LTN) Barrier Film by Power Swing Sputtering (PSS) Technique for MOCVD-Cu Damascene Interconnects." IEEE pp. 635-638.

Takahashi, Shingo, Kaori Tai, Hiizu Ohtorii, Naoki Komai, Yuji Segawa, Hiroshi Horikoshi, Zenya Yasuda, Hiroshi Yamada, Masao Ishihara, and Takeshi Nogami. 2002. "Fragile Porous-Low-k/Copper Integration by Using Electro-Chemical Polishing." 2002 Symposium on VLSI Technology Digest of Technical Papers, pp. 32-33.

Tan, K. K., H. F. Dou, and K. Z. Tang. May-Jun. 2001. "Precision Motion Control System for Ultra-Precision Semiconductor and Electronic Components Manufacturing (Abstract)." 51st Electronic Components and Technology Conference 2001. Proceedings, pp. 1372-1379 Orlando, Florida.

Tao, K. M., R. L. Kosut, M. Ekblad, and G. Aral. Dec. 1994. "Feedforward Learning Applied to RTP of Semiconductor Wafers (Abstract)." Proceedings of the 33rd IEEE Conference on Decision and Control, vol. 1, pp. 67-72. Lake Buena Vista, Florida.

Telfeyan, Roland, James Moyne, Nauman Chaudhry, James Pugmire, Scott Shellman, Duane Boning, William Moyne, Arnon Hurwitz, and John Taylor. Oct. 1995. " A Multi-Level Approach to the Control of a Chemical -Mechanical Planarization Process." Minneapolis, Minnesota: 42nd National Symposium of the American Vacuum Society.

Tobin, K. W., T. P. Karnowski, L. F. Arrowood, and F. Lakhani. Apr. 2001. "Field Test Results of an Automated Image Retrieval System (Abstract)." Advanced Semiconductor Manufacturing Conference, 2001 IEEE/SEMI, Munic, Germany.

U.S. Appl. No. 09/363,966, filed Jul. 29, 1999, Arackaparambil et al. Computer Integrated Manufacturing Techniques.

U.S. Appl. No. 09/469,227, filed Dec. 22, 1999, Somekh et al. Multi-Tool Control System, Method and Medium.

U.S. Appl. No. 09/619,044, filed Jul. 19, 2000, Yuan System and Method of Exporting or Importing Object Data in a Manufacturing Execution System.

U.S. Appl. No. 09/637,620, filed Aug. 11, 2000, Chi et al. Generic Interface Builder.

U.S. Appl. No. 09/655,542, filed Sep. 6, 2000, Yuan System, Method and Medium for Defining Palettes to Transform an Application Program Interface for a Service.

U.S. Appl. No. 09/656,031, filed Sep. 6, 2000, Chi et al. Dispatching Component for Associating Manufacturing Facility Service Requestors with Service Providers.

U.S. Appl. No. 09/725,908, filed Nov. 30, 2000, Chi et al. Dynamic Subject Information Generation in Message Services of Distributed Object Systems.

U.S. Appl. No. 09/800,980, filed Mar. 8, 2001, Hawkins et al. Dynamic and Extensible Task Guide.

U.S. Appl. No. 09/811,667, filed Mar. 20, 2001, Yuan et al. Fault Tolerant and Automated Computer Software Workflow.
U.S. Appl. No. 09/927,444, filed Aug. 13, 2001, Ward et al. Dynamic Control of Wafer Processing Paths in Semiconductor Manufacturing Processes.
U.S. Appl. No. 09/928,473, filed Aug. 14, 2001, Koh Tool Services Layer for Providing Tool Service Functions in Conjunction with Tool Functions.
U.S. Appl. No. 09/928,474, filed Aug. 14, 2001, Krishnamurthy et al. Experiment Management System, Method and Medium.
U.S. Appl. No. 09/943,383, filed Aug. 31, 2001, Shanmugasundram et al. In Situ Sensor Based Control of Semiconductor Processing Procedure.
U.S. Appl. No. 09/943,955, filed Aug. 31, 2001, Shanmugasundram et al. Feedback Control of a Chemical Mechanical Polishing Device Providing Manipulation of Removal Rate Profiles.
U.S. Appl. No. 09/998,372, filed Nov. 30, 2001, Paik Control of Chemical Mechanical Polishing Pad Conditioner Directional Velocity to Improve Pad Life.
U.S. Appl. No. 09/998,384, filed Nov. 30, 2001, Paik Feedforward and Feedback Control for Conditioning of Chemical Mechanical Polishing Pad.
U.S. Appl. No. 10/084,092, filed Feb. 28, 2002, Arackaparambil et al. Computer Integrated Manufacturing Techniques.
U.S. Appl. No. 10/100,184, filed Mar. 19, 2002, Al-Bayati et al. Method, System and Medium for Controlling Semiconductor Wafer Processes Using Critical Dimension Measurements.
U.S. Appl. No. 10/135,405, filed May 1, 2002, Reiss et al. Integration of Fault Detection with Run-to-Run Control.
U.S. Appl. No. 10/135,451, filed May 1, 2002, Shanmugasundram et al. Dynamic Metrology Schemes and Sampling Schemes for Advanced Process Control on Semiconductor Processing.
U.S. Appl. No. 10/172,977, filed Jun. 18, 2002, Shanmugasundram et al. Method, System and Medium for Process Control for the Matching of Tools, Chambers and/or Other Semiconductor-Related Entities.
U.S. Appl. No. 10/173,108, filed Jun. 18, 2002, Shanmugasundram et al. Integrating Tool, Module, and Fab Level Control.
U.S. Appl. No. 10/174,370, filed Jun. 18, 2002, Shanmugasundram et al. Feedback Control of Plasma-Enhanced Chemical Vapor Deposition Processes.
U.S. Appl. No. 10/174,377, filed Jun. 18, 2002, Schwarm et al. Feedback Control of Sub-Atmospheric Chemical Vapor Deposition Processes.
U.S. Appl. No. 10/377,654, filed Mar. 4, 2003, Kokotov et al. Method, System and Medium for Controlling Manufacturing Process Using Adaptive Models Based on Empirical Data.
U.S. Appl. No. 10/393,531, filed Mar. 21, 2003, Shanmugasundram et al. Copper Wiring Module Control.
U.S. Appl. No. 10/632,107, filed Aug. 1, 2003, Schwarm et al. Method, System, and Medium for Handling Misrepresentative Metrology Data Within an Advanced Process Control System.
U.S. Appl. No. 10/665,165, filed Sep. 18, 2003, Paik Feedback Control of a Chemical Mechanical Polishing Process for Multi-Layered Films.
U.S. Appl. No. 10/712,273, filed Nov. 14, 2003, Kokotov Method, System and Medium for Controlling Manufacture Process Having Multivariate Input Parameters.
U.S. Appl. No. 10/759,108, filed Jan. 20, 2004, Schwarm Automated Design and Execution of Experiments with Integrated Model Creation for Semiconductor Manufacturing Tools.
U.S. Appl. No. 10/765,921, filed Jan. 29, 2004, Schwarm System, Method, and Medium for Monitoring Performance of an Advanced Process Control System.
U.S. Appl. No. 10/809,906, filed Mar. 26, 2004, Surana et al. A Technique for Process-Qualifying a Semiconductor Manufacturing Tool Using Metrology Data.
U.S. Appl. No. 10/809,908, filed Mar. 26, 2004, Yang et al. Improved Control of Metal Resistance in Semiconductor Products via Integrated Metrology.
U.S. Appl. No. 10/812,480, filed Mar. 30, 2004, Padhi et al. Selective Metal Encapsulation Schemes.
U.S. Appl. No. 10/856,016, filed May 28, 2004, Paik Improved Process Control by Distinguishing a White Noise Component of a Process Variance.
Van der Straten, O., Y. Zhu, E. Eisenbraun, and A. Kaloyeros. 2002. "Thermal and Electrical Barrier Performance Testing of Ultrathin Atomic Layer Deposition Tantalum-Based Materials for Nanoscale Copper Metallization." IEEE pp. 188-190.
Van Zant, Peter. 1997. Microchip Fabrication: A Practical Guide to Semiconductor Processing. Third Edition, pp. 472-478. New York, New York: McGraw-Hill.
"Wafer flatness measurement of advanced wafers." Printed Dec. 9, 2003. http://www.phase-shift.com/wafer-flatness.shtml.
Wang, LiRen and Hefin Rowlands. 2001. "A Novel NN-Fuzzy-SPC Feedback Control System." 8th IEEE International Conference on Emerging Technologies and Factory Automation, pp. 417-423.
Williams, Randy, Dadi Gudmundsson, Kevin Monahan, Raman Nurani, Meryl Stroller and J. George Shanthikumar. Oct. 1999. "Optimized Sample Planning for Wafer Defect Inspection," Semiconductor Manufacturing Conference Proceedings, 1999 IEEE International Symposium on Santa Clara, CA. Piscataway, NJ. pp. 43-46.
Wu, Z.C., Y.C. Lu, C.C. Chiang, M.C. Chen, B.T. Chen, G.J. Wang, Y.T. Chen, J.L. Huang, S.M. Jang, and M.S. Liang. 2002. "Advanced Metal Barrier Free Cu Damascene Interconnects with PECVD Silicon Carbide Barriers for 90/65-nm BEOL Technology." IEEE pp. 595-598.
Yamagishi, H., Z. Tokei, G.P. Beyer, R. Donaton, H. Bender, T. Nogami, and K. Maex. 2000. "TEM/SEM Investigation and Electrical Evaluation of a Bottomless I-PVD TA(N) Barrier in Dual Damascene" (Abstract). Advanced Metallization Conference 2000. San Diego, CA.
Yasuda, M., T. Osaka, and M. Ikeda. Dec. 1996. "Feedforward Control of a Vibration Isolation System for Disturbance Suppression (Abstract)." Proceedings of the 35th IEEE Conference on Decision and Control, vol. 2, pp. 1229-1233. Kobe, Japan.
Yeh, C. Eugene, John C. Cheng, and Kwan Wong. 1993. "Implementation Challenges of a Feedback Control System for Wafer Fabrication." IEEE/CHMT International Electronics Manufacturing Technology Symposium, pp. 438-442.
Zhe, Ning, J. R. Moyne, T. Smith, D. Boning, E. Del Castillo, Yeh Jinn-Yi, and Hurwitz. Nov. 1996. "A Comparative Analysis of Run-to-Run Control Algorithms in Semiconductor Manufacturing Industry (Abstract)." IEEE/SEMI 1996 Advanced Semiconductor Manufacturing Conference Workshop, pp. 375-381.
Zhou, Zhen-Hong and Rafael Reif. Aug. 1995. "Epi-Film Thickness Measurements Using Emission Fourier Transform Infrared Spectroscopy—Part II: Real-Time in Situ Process Monitoring and Control," IEEE Transactions on Semiconductor Manufacturing, vol. 8, No. 3.
Zorich, Robert. 1991. Handbook of Quality Integrated Circuit Manufacturing. pp. 464-498 San Diego, California: Academic Press, Inc.
Nov. 30, 2005. Notice of Allowance for U.S. Appl. No. 10/856,016.

* cited by examiner

ADJUSTING MANUFACTURING PROCESS CONTROL PARAMETER USING UPDATED PROCESS THRESHOLD DERIVED FROM UNCONTROLLABLE ERROR

CROSS-REFERENCE TO RELATED APPLICATIONS

This application is a continuation of U.S. patent application Ser. No. 10/855,711, filed May 28, 2004 now U.S. Pat. No. 6,961,626, which is incorporated herein its entirety by reference. This application is related to co-pending U.S. patent application Ser. No. 10/856,016, filed May 28, 2004, entitled Improved Process Control By Distinguishing a White Noise Component of a Process Variance which is incorporated herein its entirety by reference.

BACKGROUND OF THE INVENTION

1. Field of the Invention

The present invention concerns computer-implemented and/or computer-enabled methods, systems, and mediums for enabling improved feedback and feedforward control during process control. More specifically, one or more embodiments of the present invention relate to run-to-run control, including determining offset and feedback threshold values during real-time process control, particularly in connection with semiconductor manufacturing.

2. Description of the Related Art

Detecting and controlling errors during a manufacturing process is an important goal. This is particularly true in connection with the process of manufacturing semiconductors. During the manufacturing process, various measurements are made in order to detect and/or determine errors e.g., to detect when an observed value differs significantly from an intended target result. When the difference is sufficient, the manufacturing process control system will attempt to control (e.g., compensate for) the error so as to continue to produce products (e.g., chips) that are within acceptable ranges or tolerances from the target result. The difference between the target and measured values that will trigger a compensation operation is known as the threshold error or feedback threshold.

It has been observed that material such as a wafer that is processed in connection with a semiconductor manufacturing process will inevitably include at least some error or some deviation from the intended target result or specification. In order to determine when it is desired to perform additional control in order to make an adjustment during processing, conventional systems utilize a feedback threshold as a trigger. Whenever a compensation or control operation is triggered and the adjustment is made, however, the result following the adjustment still will usually deviate from the intended target result. Further, there are tolerances within which a tighter adjustment of a control does not effectively cause the material to be processed closer to specification, since the control is simply not capable of a sufficiently fine adjustment.

Conventionally, control of an error is attempted when one or more preconditions assigned to the tolerance range for the target specification using a statistical approach are satisfied. The conventional statistical approach employs a standard deviation. Nevertheless, even when the process control system uses standard deviation as the threshold value, there is always a lack of precision, or a tolerance range within which it is not truly possible to control more tightly.

Typically, a statistical process variance or standard deviation that is determined under optimal conditions as an estimation of processing error. Specifically, current methods predetermine the amount of an observed output that is unadjustable process noise, and thus the range that the controller cannot further improve upon, in an open-loop (i.e., no feedback). This predetermined amount is then applied to (e.g., subtracted from) the actual measurements derived from the device, process and/or material being measured. Thus, statistical process variance measured while the process, material to be processed, and processing device conditions are at an atypically pristine state is used as a substitute for what would otherwise be a truer (e.g., more real world) measurement of a process variance. The measurement at this atypical condition is then used as an estimation of the processing variance occurring throughout the manufacturing process under consideration.

Statistical use of standard deviation in connection with observed deviation is illustrated, for example in "Statistical feedback control of a plasma etch process", P. Mozumder et al., IEEE Transactions on Semiconductor Manufacturing, Vol. 7, No. 1 (February 1994). The statistical variance $S_k$ at the kth run is calculated using the standard deviation as:

$$s_k = \sqrt{\frac{1}{n-1}\left[\sum_{i=1}^{n} X_{k-i+1}^2 - n(\overline{X})^2\right]} \quad (1)$$

where,
n=number of samples
x=deviation of observed value from predicted value

The conventional process control system compares the observed standard deviation to a threshold in order to determine if the deviation is acceptable. Once the standard deviation greater than the threshold is detected, the process model's tuning procedures for increasing control are invoked. In the conventional process control method, the standard deviation is used to determine the level for the threshold or trigger. Within the threshold, it is assumed that the deviation cannot be sufficiently controlled.

The conventional use of measurements at pristine conditions in estimating threshold error, despite its industry acceptance, is not a reasonably accurate reflection of process error during real manufacturing conditions. One of many reasons that measurements at pristine conditions do not reasonably reflect true conditions is that materials such as wafers processed in most front and back end processing devices in the semiconductor industry have relationships or effects on subsequently processed wafers between runs ("run-to-run"). Accordingly, conditions applied to and/or affected by wafers that were previously processed in a processing device will have residual effects on wafers that are currently being processed in that processing device. An estimation of threshold error derived from measurements taken while the processing device is at a steady state, consequently, does not reflect the fluctuations introduced during run-to-run processing.

Therefore, there remains a need to have improved control, particularly within a tolerance range associated with a target specification. There also remains a need to address the effects of run-to-run conditions on such measurements.

SUMMARY OF THE INVENTION

The present invention provides a way to determine the error within standard deviation that is caused by two components: a white noise component and a signal component (such as systematic errors). The white noise component is random noise and therefore is relatively non-controllable. The systematic errors, in contrast, may be controlled by changing the control parameters in a manufacturing process. A ratio between the two components is calculated autoregressively. Based on the ratio and using the observed or measured error (as, e.g., typically made over the course of several measurements), the actual value of the error caused by the white noise is calculated. The actual value of the error is then used in determining whether and how to change the control parameters of the manufacturing. The autoregressive stochastic sequence addresses the issue of real-time control of the effects of run-to-run deviations, and provides a mechanism that can extract white noise from the statistical process variance in real time. This results in an ability to provide tighter control of feedback and feedforward variations.

In one aspect of the invention, a computer-implemented method is provided for determining a process threshold for updating a process recipe or process model in a manufacturing process for a plurality of products. The method includes the steps of (a) inputting a model for a manufacturing process having at least one control parameter that predicts a value for a product characteristic and that sets a process threshold for modifying the model; (b) receiving an observed value at least one product and calculating a variance between the observed value and the predicted value; (c) using the variance in an auto-regressive stochastic sequence to calculate a first portion of the variance caused by white noise and a second portion of the variance caused by a systematic or controllable error over the plurality of products; and (d) using one of the first and second portions of the variance to update the process threshold of the model.

In one or more embodiments, the portion of the variance caused by white noise is used to update the process threshold.

BRIEF DESCRIPTION OF THE DRAWING

The present invention is described with reference to the following figures. Throughout this discussion, similar elements are referred to by similar numbers in the various figures for ease of reference. The above mentioned and other features and advantages of the present invention will become more readily apparent from the following detailed description and the accompanying drawings, in which.

DETAILED DESCRIPTION OF THE INVENTION

Process control is used in semiconductor manufacturing to maintain one or more characteristics of the product, e.g., a semiconductor wafer, to within acceptable and predictable ranges. In implementing process control, a model of the process is developed that predicts wafer characteristics for a given set of input conditions. A manufacturing recipe is obtained based in whole or in part on the model. A product characteristic of interest is monitored during processing, and variations in the product output from the target value are used to provide a feedback loop for updating the deposition recipe in the process control box, as is shown schematically in FIG. 1.

Figure 1:
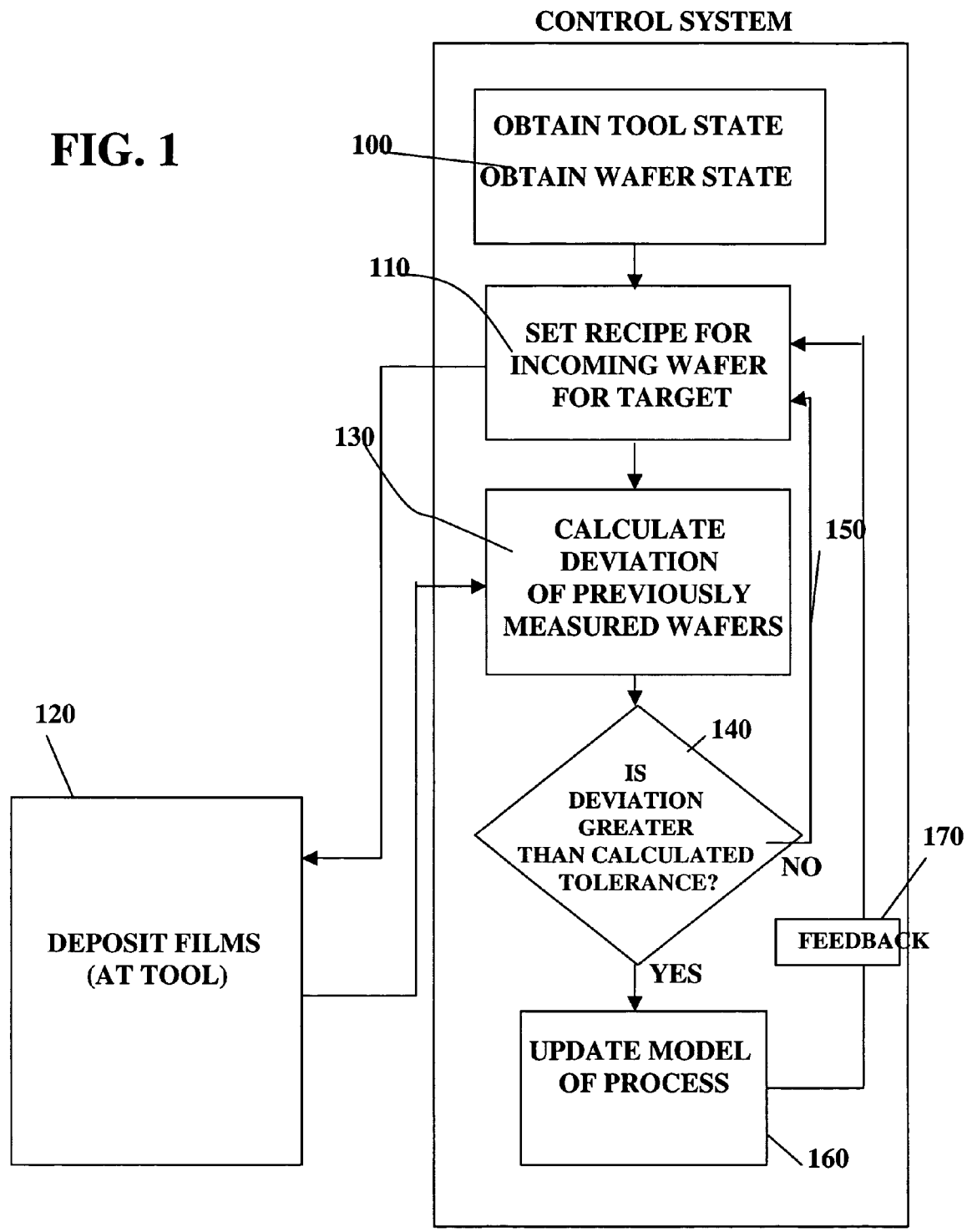
FIG. 1 is a flow diagram of a feedback loop used in a process controlled operation according to one or more embodiments of the present invention.

According to the processing flow diagram in FIG. 1, initial processing conditions (e.g., an initial tool state and initial wafer state) are identified that will provide a desired wafer property in step 100. The initial conditions may be determined empirically or by using the processing model. If a processing model is used, a controller can use this model to calculate processing times and processing parameters (i.e., to set the recipe for one or more incoming wafers) to produce a wafer having a target characteristic, as shown in step 110. The wafer is processed at step 120 according to the initial recipe. The characteristic of interest is measured and deviation from the predicted value is determined in step 130. In step 140 it is determined whether the deviation between the predicted and observed behavior exceeds an established threshold (the feedback threshold). If the deviation is within acceptable ranges, no changes are made to the model and the recipe is unchanged (step 150). If the deviation is outside acceptable limits, then this information is marked to trigger a change in the model as described in step 160 and this information is fed back to the model in step 170 and thus into the controller where the processing recipe is optimized according to an updated model that takes the deviation from the predicted value into consideration.

Conditions encountered while processing are such that conditions applied to previously processed materials (e.g., wafers) have some residual effects on the condition of the processing device in connection with the current wafers being processed, including both white noise and controllable errors. If a wafer was processed through a particular chamber in a processing device, resulting in a particular chamber condition, that chamber condition has some inertia, which can have a residual effect on subsequent conditions of the chamber. The next wafer to be processed in that chamber will be affected due to the inertia of the previous chamber condition. Furthermore, as the processing recipe is refined in response to updates and improvements of the processing model used in the process control system, the uncontrollable error generated or experienced by the process may diminish. Thus, the magnitude of uncontrollable error may vary in real time during the manufacturing process. In one or more embodiments of the present invention, a feedback threshold value is calculated for a manufacturing process that reflects these real time conditions in the manufacturing process.

Some portion of the measurement is actually due to white noise, which represents an uncontrollable error. One example of white noise in a semiconductor manufacturing system is a disturbance in ambient temperature, which is neither measured nor controlled, but which would result in a change in thickness of the product. When determining whether an error occurred and/or how much to control an error that may occur during the manufacturing process, both systematic variance and white noise should be identified, as only systematic error can be affected by the processing conditions. The standard deviation calculation used in the prior art does not distinguish between systematic variation and white noise variation as a part of the error. Hence, conventionally both the systematic and white noise variations are controlled together, rather than separately.

In one or more embodiments of the present invention, the value of white noise is extracted from the statistical process variance, for example by utilizing an autoregressive stochastic sequence such as the one described below. This permits tighter control of error, which is helpful according to one or more embodiments of the present invention in determining a dynamic threshold for tighter feedback and/or feed forward control, while taking into consideration the real time run-to-run conditions relating to the process, material, and/or processing device.

In one or more embodiments of the present invention, an $n^{th}$ order autoregressive stochastic sequence may be used to express the effect of systematic variation and white noise on an observed error. In one or more embodiments, such a relationship may be expressed as:

$$X_k = \rho_1 * X_{k-1} + \rho_2 * X_{k-2} + \ldots + \rho_n * X_{k-n} + W_k \quad (2)$$

where $W_k$ = white noise
$\rho_n$ = auto-correlation coefficient at lag n at run k
$X_k$ = controlled output at run k
lag n = relationship between every $n^{th}$ wafer For at least some applications, the effects of the wafer immediately preceding the current wafer (lag 1) are adequate to define the overall effect of previously processed wafers on the current wafer, and the run-to-run control of the wafers simplifies to:

$$X_k = \rho_1 * X_{k-1} + W_k, \quad (3)$$

where $$\rho_1 = \frac{C_k}{C_0}$$

where $C_k$ = autocorrelation factor, and $\quad (4)$ $$C_k = \frac{1}{N} \sum_{t=1}^{N-n} (Z_t - Z_{ave})(Z_{t+k} - Z_{ave})_{k=1,2,\ldots n} \quad (5)$$

where N = total number of samples
n = lag
$Z_t$ = value for sample t
$Z_{ave}$ = average value for all N samples For a lag of 1, the autocorrelation factor is defined as:

$$C_k = \frac{1}{N} \sum_{t=1}^{N-1} (Z_t - Z_{ave})(Z_{t+1} - Z_{ave}). \quad (6)$$

To extract the noise from the relationship set forth in equation (3), the variance analysis may be taken in two steps according to one or more embodiments of the invention. First, $$V_x = \rho_1^2 * V_x + V_w \quad (7)$$

where w = white noise
x = systematic error
$V_x$ = variance of the systematic error
$V_w$ = variance of the white noise
Next, $$\delta_w/\delta_x = (1 - \rho_1^2)^{0.5} \quad (8)$$

where $\delta$ represents the standard deviation.
The standard deviation of the observed value ($\delta_N$) may be expressed as:

$$\delta_N = \delta_x + \delta_w \quad (9)$$

where $\delta_x$ = a value representing the variation that a system can control (i.e., a systemic component)
$\delta_w$ = a value representing the random variation that is relatively non-controllable (i.e., the white noise component)

From equation (9), the following can be derived:

$$\delta_N = y \quad (10)$$

where y = calculated value from N samples of the previous wafers, and, $$\delta_w/\delta_x = z \quad (11)$$

where z = calculated value from equation (8)
From equations (8), (9), (10) and (11), it follows that:

$$\delta_x = y/(1+z). \quad (12)$$

Wafers that have been processed in a sequence (run-to-run) by a given device or system typically have a relationship to each other in terms of a variance that they create. In summary, equation (3) is one example of taking into consideration the run-to-run control of wafers; it addresses information representative of the sequence and the relationship between the wafers and the sequence. Based on the ratio between the white noise and the observed error in the signal, it can be determined what the total amount of error is. By using feed forward analysis, the process in which error is observed can be appropriately controlled. Referring to equation (9), the observed value now has been differentiated into two portions, one of which is white noise and the other of which is the potentially controllable deviation, also referred to as systematic deviation.

The foregoing sequence is but an example of the relationships that may be used to express the effect of systematic variance and white noise on a controlled output. Other relationships may be used in accordance with one or more embodiments of the invention to define the relationship between the two.

Consider for instance that a chemical mechanical polishing (CMP) processing device will be used in a semiconductor process control system to polish twenty-five wafers. $X_k$ is wafer twenty-five, $X_k-1$ is wafer twenty-four, etc. Because of the relationship and effect run-to-run wafers have on each other, the analysis used herein refers back to the previous wafer(s) (i.e., $X_k$, $X_k-1$, etc.) in determining how much control effectively may be applied to $X_k$, the wafer presently being processed.

Figure 2:
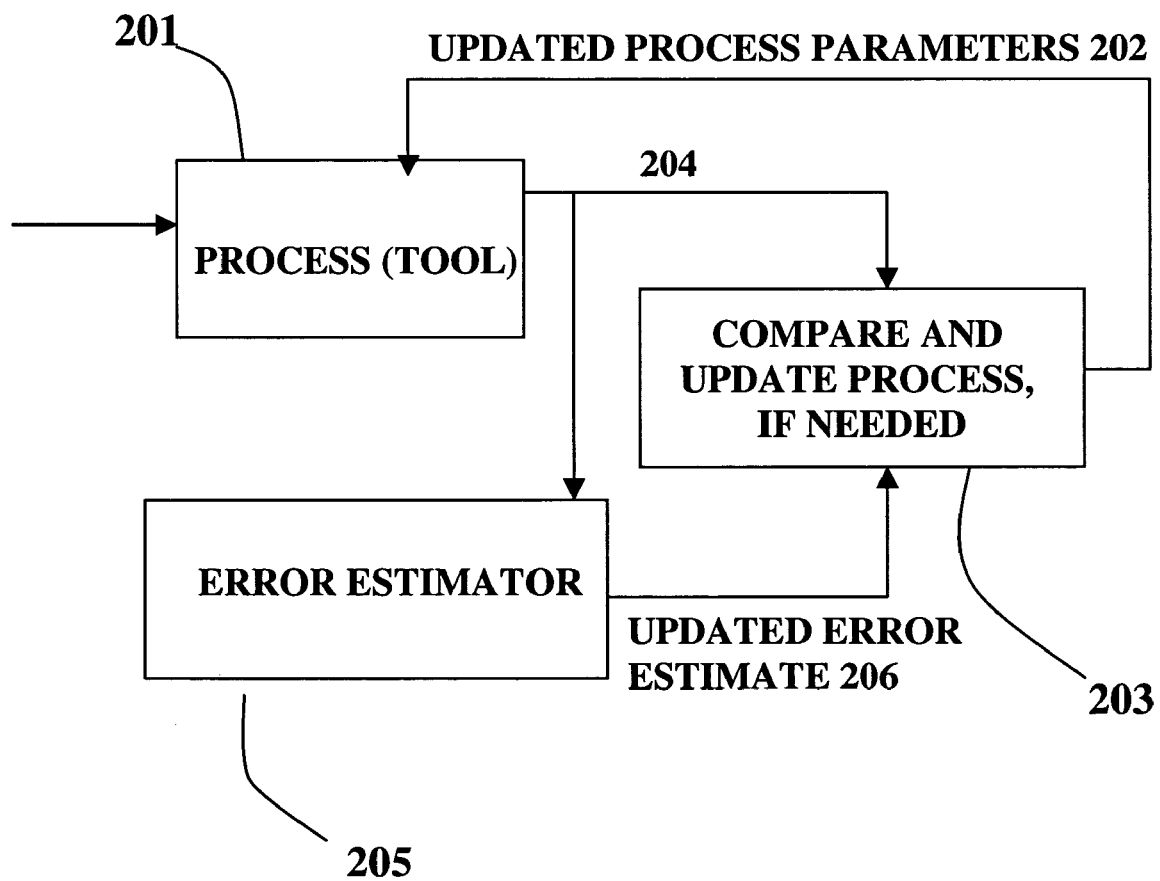
FIG. 2 is a block diagram of a recursive parameter estimation for use in connection with one or more embodiments of the present invention.

In one or more embodiments of the present invention, error estimation is integrated into a process control system, such as is shown in FIG. 1. Referring to FIG. 2, an integrated system is described that includes a process control and an estimator system according to one or more embodiments of the present invention. Process block 201 receives input control parameter 202 values, performs a manufacturing process according to the input control parameter values and the process recipe, and produces an output 204 indicative of the actual measured value for the wafer characteristic of interest. As shown in FIG. 2, block 203 compares the observed and predicted values of a characteristic of interest and uses the difference in a feedback mechanism to update the processing parameters. Either the process model or the process recipe can be updated. Estimator block 205 performs a white noise estimation for the series of N samples based upon measured values (output from 201) using for example an autoregressive stochastic system (such as equation (2)). The extracted estimation of white noise is used to update the error tolerances (process threshold) of the process model. The updated estimation of white noise 206 is input into block 203 for use as a process threshold in comparing the measured and predicted values of a characteristic of interest. The feedback mechanism of comparing the measured against the predicted output values takes place at 203, and the threshold is the on/off mechanism for the decision to control the process for the next wafer at the process control block 201, updated process parameters, if needed, are input into the process control block 201.

In one or more embodiments of the present invention, the calculated white noise portion of the variance is used as a weighing factor to adjust an estimated gain that is used as a weighing factor in the determination of updated process parameters. In one or more embodiments of the present invention the model includes two or more control parameters, both of which can be adjusted using the estimated gain.

The conventional method would condition control on a conventional threshold based on an open loop control output data, whereas the current method provides a dynamic threshold. The difference between the two methods is exemplified in the following example. Table 1 illustrates simulated data comparing the calculation of a threshold using standard deviation to the calculation of a threshold with an embodiment of the present invention. In Table 1, the number of minimum samples is N=10.

TABLE 1

| Sample Number | Simulated Sample Output Values | Threshold with Standard Deviation | Threshold with the Invention |
|---|---|---|---|
| 1 | 3927 | | |
| 2 | 3893 | | |
| 3 | 3797 | | |
| 4 | 3713 | | |
| 5 | 3627 | | |
| 6 | 3602 | | |
| 7 | 3694 | | |
| 8 | 3732 | | |
| 9 | 3753 | | |
| 10 | 3781 | 45.0 | 14.1 |
| 11 | 3739 | 45.0 | 12.3 |
| 12 | 3694 | 45.0 | 9.2 |
| 13 | 3684 | 45.0 | 7.8 |
| 14 | 3673 | 45.0 | 7.8 |
| 15 | 3743 | 45.0 | 7.9 |
| 16 | 3753 | 45.0 | 5.4 |
| 17 | 3746 | 45.0 | 5.1 |
| 18 | 3710 | 45.0 | 5.3 |
| 19 | 3736 | 45.0 | 5.3 |

As shown in the above simulated data, the conventional process control system utilizes a threshold calculated to be at 45.0 using an open-loop standard deviation calculation. In other words, the conventional standard deviation approach fixes the threshold or trigger at the open-loop standard deviation. Where the observed values are within the threshold, the process control system, e.g., the process of determining the best recipe for meeting a target output, does not attempt to control the error, whereas if the values are outside the threshold, the process control system does attempt to control the error. In contrast, the threshold calculated utilizing the invention is dynamic and varies by presenting a sensitive threshold in real-time for feedback and feedforward control.

In the simulated example, the sample pool has N=10. For the first 10 wafers, a feedback threshold of 45 is used for both systems to determine whether to adjust the processing model to better control the output target. During these 10 wafers, the model is updated to achieve the target output, but the feedback threshold remains the same. The conventional process continues to use the open-loop standard deviation at a threshold. For the exemplary process according to one or more embodiments of the present invention, however, the first 10 samples are used in a recursive parameter estimation process and the feedback threshold is adjusted downward. Each successive sample is subjected to recursive parameter estimation using the previous 10 samples. The threshold varies from 14.1 down to 5.1 in the simulated data in Table 1 and appears to converge at a value of about 5.3. This represents a more accurate estimation of the white noise error in the process.

Values within the threshold can be disregarded since they cannot be effectively controlled. On the other hand, outside the threshold it is possible and useful to control the deviation. The reason that one ignores the value below the threshold is that this represents the calculated noise, and noise is not controllable. Once the threshold has been defined more accurately, as with the present invention, better control can be provided. Hence, the present invention offers a more sensitive detection and/or control of true errors than the conventional process control system utilizing a fixed threshold.

Figure 3:
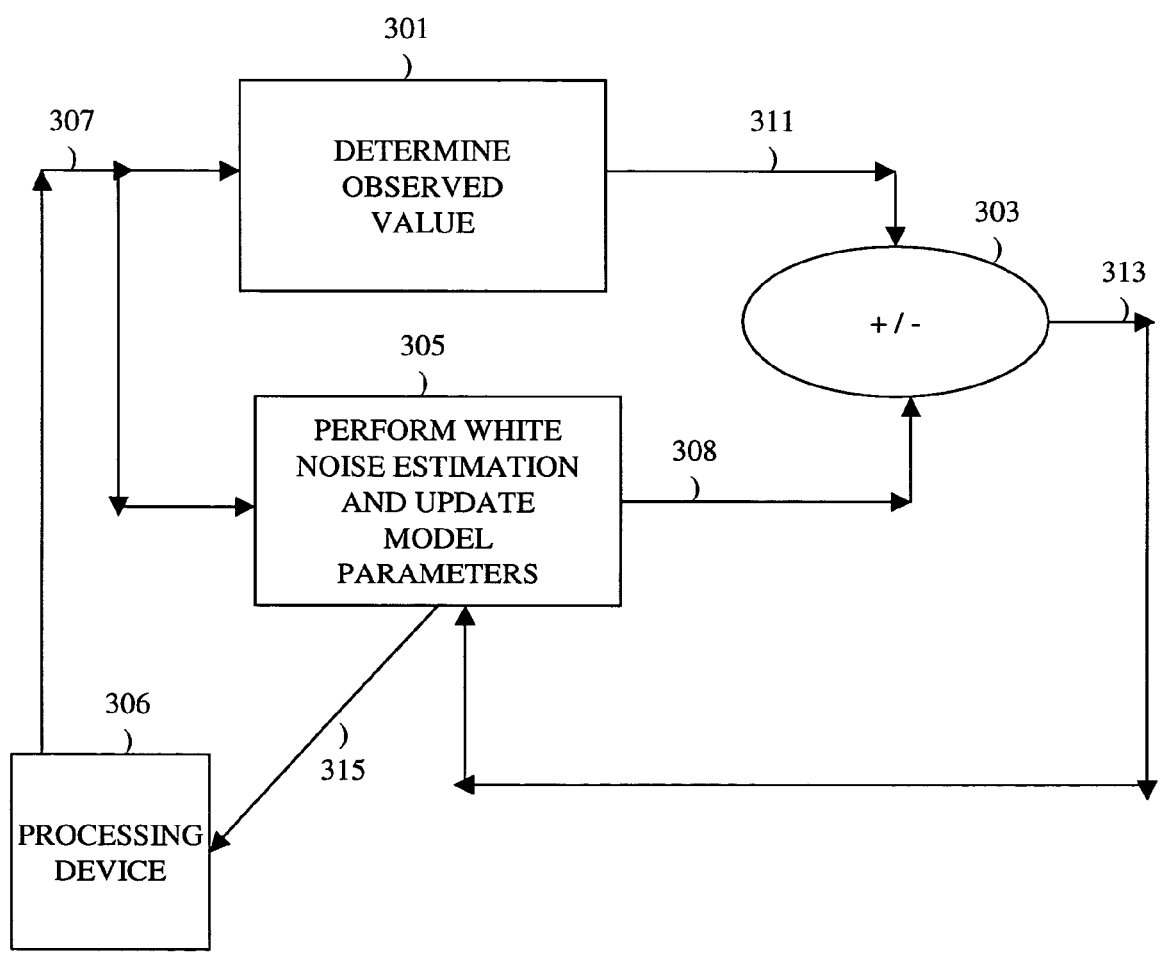
FIG. 3 is a block diagram of an example of the recursive parameter estimation according to one or more embodiments of the present invention.

Reference is now made to FIG. 3, a block diagram illustrating use of one or more embodiments of the invention in connection with a chemical mechanical polishing ("CMP") process. However, it is not intended to limit the invention to CMP, as it can be applied in connection with a number of processes, such as chemical vapor deposition ("CVD"), or etching or many other processes within the semiconductor industry. Moreover, the present invention may also be used with types of process control system, in addition to the semiconductor industry, which are concerned with measurement of true error as discriminated from observed error.

In the CMP process example of FIG. 3, processing device 306 controls the conventional controls of pressure, state, time, flow rate, etc., in connection with the wafers that are to be polished. At block 306, the polish processing device treats wafers according to the parameters describing the polish process. The measured values (or raw data from which these values can be generated) 307 for wafer samples are obtained from processing device 306 and used by block 301 to determine an observed value and by block 305 to estimate white noise using recursive parameter estimation and to update model parameters. Using the updated error estimation, block 305 updates the model parameters, and produces a predicted value 308 that is what the measured value is expected to be. Block 301 determines and outputs observed, actual measurements 311 of the wafers after they have been polished. The difference 313 between the actual measurements 311 and the predicted value 308 from the estimator block 305 is determined in block 303. Block 303 determines the error in the prediction, which is then further input into the estimator block 305, to be used as feedback in connection with the recursive parameter estimation, to avoid over-reacting to the noise that may be present in the observed, actual measurement. According to one or more embodiments of the invention, the noise is approximately extracted by the estimator block 305 utilizing the auto-regressive stochastic sequence. The updated model parameters 315 are provided to the processing device 306 for further sample processing.

Figure 4:
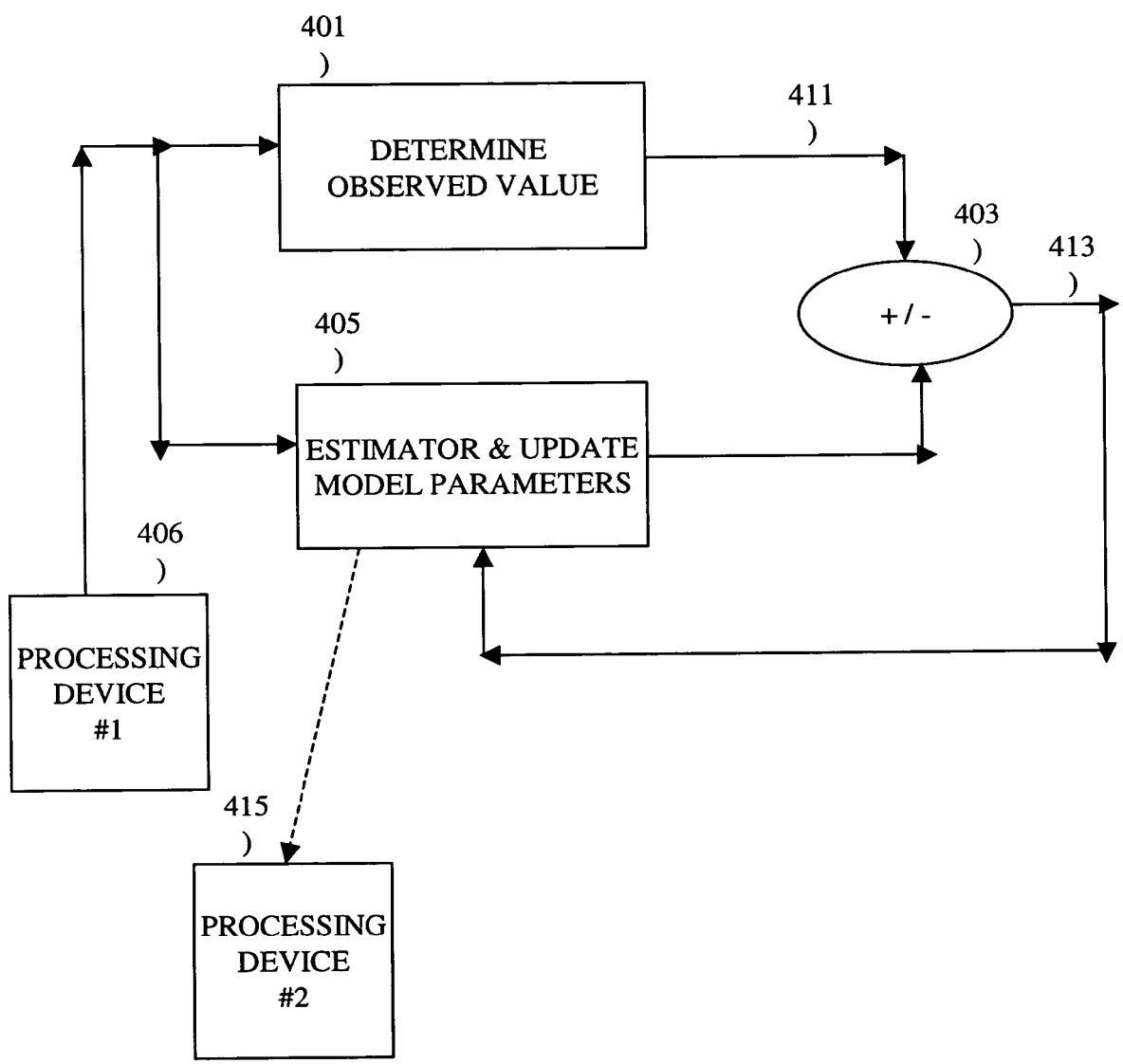
FIG. 4 is a block diagram of recursive parameter estimation according to one or more embodiments of the invention.

As an example of another use of the invention, consider that a specification is provided which requires the process control system to produce wafers of a certain thickness, among other things, so that a target thickness is indicated. In this particular processing sequence example, shown in FIG. 4, two processing devices 406, 415 are utilized in sequence, so that the second processing device can compensate for the first processing device (e.g., CMP). Referring to FIG. 4, the process block 401 outputs the observed measurements 411 obtained from the first processing device 406, in order to ultimately be used for making adjustments to the second processing device 415. Those outputs are utilized in determining the variance, or predicted error, 413 at block 403 of the observed values from the predicted values. The predicted error 413 is then utilized to make adjustments to the second processing device 415, after being adjusted for white noise via the estimator and update model parameters block 405, preferably utilizing the autoregressive stochastic sequence discussed above. By so doing, the second processing device compensates for deficiencies and variances caused by the first processing device, such that according to this example, the wafers produced from the second processing device are within the range of specified target thickness.

In the above description, the measurement of the products is described as being taken in relation to a pre-determined specification. The measurements also could be taken in relation to a real-time calculation based on prior measurements. In accordance with at least one or more embodiments, multiple specifications could be provided.

Figure 5:
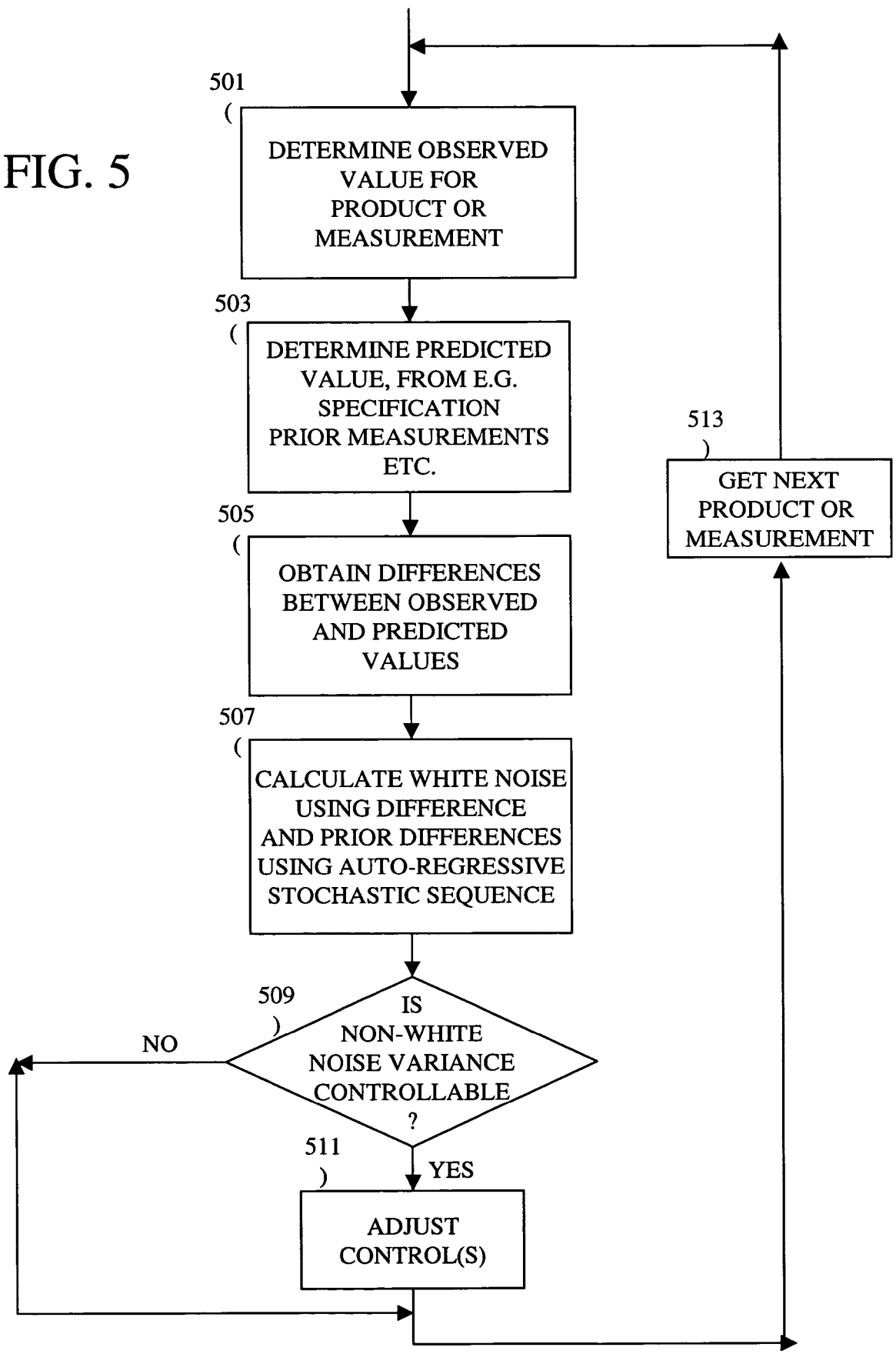
FIG. 5 is a flow chart of the recursive parameter estimation, utilizing the invention illustrated in FIG. 2.

FIG. 5 is a flow chart representing one or more embodiments of the present invention. At step 501, the observed value for the product (or other measurement) is determined. At step 503, the predicted value is determined, including for example from a specification or from a prior measurement. At step 505, the difference, or predicted error, between the observed value and the predicted value is obtained. At step 507, the white noise portion of the observed error is calculated, using the current and prior observed errors, in an auto-regressive, stochastic sequence. At step 509, it is determined whether the non-white noise portion of the observed error is controllable. If so, the system may adjust the control parameters 511. At step 513, the system gets the next product to be measured, or obtains the next measurement.

Also, as described above, the difference between the measurements of the product, such as a wafer, and the specification for that product is calculated. However, the process control system may also calculate a statistical variance between such measurements and the specification. As described above, the specification could be pre-determined or could be based on a real-time calculation, such as determined by prior measurements.

From the difference or variance between observed values and predicted values, the process control system may, in effect, calculate two portions, as explained above. The first portion is indicative of that portion of the difference caused by random noise, random variance, and/or normal deviation. The second portion determined by the system is indicative of the difference or variation caused by a systematic error or systematic variance over two or more products. Both the first and second portions are calculated from a statistical variance. The ability to separate white noise from the statistical variance to obtain information about white noise during real-time provides more accurate determinations of error than the aforementioned conventional techniques and may lead to improved test and yield analysis. Alternatively (or additionally), the differentiation is performed, but not on a real-time basis.

If the actual variance exceeds a threshold, the process control system then may or may not attempt to control the process. For example, the process control system may adjust one or more control parameters that affect the process and that are relevant to the processing device, such as gas pressure, temperature, etc., thereby controlling the production environment. Hence, the process may be more tightly controlled, based upon the calculated second portion of the differences or variance.

Figure 6:
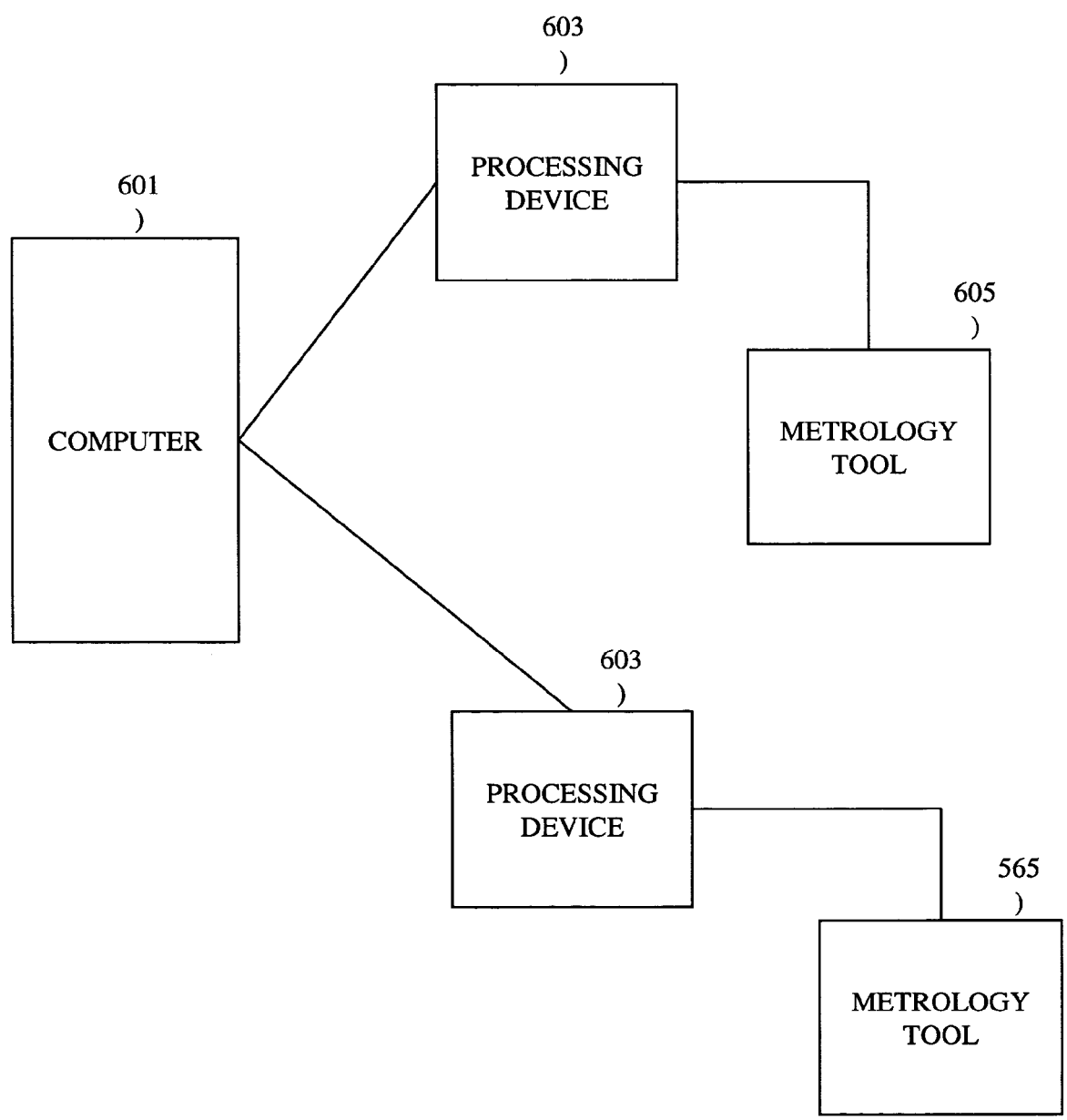
FIG. 6 is a block diagram of a computerized process control system, which may be used in connection with one or more embodiments of the present invention.

The present invention may be particularly useful within any numbers of industries (such as the semiconductor industry) in connection with obtaining higher quality, increased throughput, lower cost of operation, and shorter ramp-up time. It is suitable for use in process control systems concerned with, for example, wafer-to-wafer thickness control, uniformity control, within-wafer range control, defect analysis and/or control, etch critical dimension control, chemical vapor deposition thickness and/or uniformity control, physical vapor deposition uniformity and/or thickness control, metrology variations, and other process control, analysis, and/or measurement situations and processing devices. Other parameters that can be controlled in connection with semiconductor manufacturing include applying or changing electrical power, placing different gases into a chamber, changing distances between electrodes, etc. There are numerous variables in semi-conductor manufacturing that are to be measured and variances that may be controlled. The present invention is suitable for use in these situations As one example, the process control system may include a general purpose computer 601 as illustrated in FIG. 6, or a specially programmed special purpose computer. It may also be implemented as a distributed computer system rather than a single computer; some of the distributed systems might include embedded systems. Further, the programming may be distributed among one or more processing devices 603 themselves or other parts of the process control system. Similarly, the processing could be controlled by a software program on one or more computer systems or processors, or could be partially or wholly implemented in hardware. Moreover, the process control system may communicate directly or indirectly with the relevant processing devices and/or components thereof, such as metrology tools 605. As another alternative, the portion of the process control system that is relevant may be embedded in the processing device itself.

As another example, the system may be implemented on a web based computer, e.g., via an interface to collect and/or analyze data from many sources. It may be connected over a network, e.g., the Internet, an Intranet, or even on a single computer system. Moreover, portions of the system may be distributed (or not) over one or more computers, and some functions may be distributed to other hardware, such as tools, and still remain within the scope of this invention. The user may interact with the system via e.g., a personal computer or over PDA, e.g., the Internet, an intranet, etc. Either of these may be implemented as a distributed computer system rather than a single computer. Similarly, a communications link may be a dedicated link, a modem over a POTS line, and/or any other method of communicating between computers and/or users. Moreover, the processing could be controlled by a software program on one or more computer systems or processors, or could even be partially or wholly implemented in hardware.

User interfaces may be developed in connection with an HTML display format. It is possible to utilize alternative technology for displaying information, obtaining user instructions and for providing user interfaces.

The system used in connection with the invention may rely on the integration of various components including, as appropriate and/or if desired, hardware and software servers, database engines, and/or other process control components. The configuration may be, alternatively, network-based and may, if desired, use the Internet as an interface with the user.

The system according to one or more embodiments of the invention may store collected information in a database. An appropriate database may be on a standard server, for example, a small Sun™ Sparc™ or other remote location. The information may, for example, optionally be stored on a platform that may, for example, be UNIX-based. The various databases maybe in, for example, a UNIX format, but other standard data formats may be used.

Although the process control system is illustrated as having a single computer, the system according to one or more embodiments of the invention is optionally suitably equipped with a multitude or combination of processors or storage devices. For example, the computer may be replaced by, or combined with, any suitable processing system operative in accordance with the principles of embodiments of the present invention, including sophisticated calculators, hand held, laptop/notebook, mini, mainframe and super computers, one or more embedded processors, as well as processing system network combinations of the same. Further, portions of the system may be provided in any appropriate electronic format, including, for example, provided over a communication line as electronic signals, provided on floppy disk, provided on CD Rom, provided on optical disk memory, etc.

Any presently available or future developed computer software language and/or hardware components can be employed in such embodiments of the present invention. For example, at least some of the functionality mentioned above could be implemented using Visual Basic, C, C++ or any assembly language appropriate in view of the processor being used. It could also be written in an interpretive environment such as Java and transported to multiple destinations to various users.

The invention may include a process and/or steps. Where steps are indicated, they may be performed in any order, unless expressly and necessarily limited to a particular order. Steps that are not so limited may be performed in any order.

As another example, deviation has been described as controlled above a certain threshold. In certain situations, it would be appropriate to consider deviation as controllable in an inverse manner. In other situations, deviation may have a range, above and below which control is possible.

The foregoing detailed description includes many specific details. The inclusion of such detail is for the purpose of illustration only and should be understood to limit the invention. In addition, features in one embodiment may be combined with features in other embodiments of the invention. Various changes may be made without departing from the spirit and scope of the invention as defined in the following claims.

What is claimed is:

1. A computer-implemented method for controlling a manufacturing process, comprising the steps of:
    (a) inputting a model for the manufacturing process and obtaining a manufacturing recipe based on the model, wherein the model predicts at least one value for a product characteristic of at least one product processed by the manufacturing process;
    (b) receiving at least one observed value for the product characteristic of the at least one product and determining a variance between the at least one observed value and the at least one predicted value;
    (c) determining a value for uncontrollable error from the variance;
    (d) using the value for uncontrollable error to update a process threshold; and
    (e) adjusting at least one control parameter of the manufacturing process using the updated process threshold, wherein the manufacturing process includes at least one device on which the at least one product is processed, the at least one device being affected by the at least one control parameter.

2. The method of claim 1, wherein the variance is determined from the at least one observed value observed for N previously processed products.

3. The method of claim 2, wherein N is in the range of 5 to 100.

4. The method of claim 2, wherein N is in the range of 10 to 40.

5. The method of claim 1, further comprising the step of: using the value for uncontrollable error to update the at least one control parameter.

6. The method of claim 5, wherein the value for uncontrollable error is used as a weighing factor to adjust an estimated gain in the updating of the at least one control parameter.

7. The method of claim 1, wherein the value for uncontrollable error is determined using an auto-regressive stochastic sequence.

8. The method of claim 1, wherein the uncontrollable error includes at least one of random variance, normal deviation, and an ambient fluctuation.

9. The method of claim 1, wherein the model predicts the at least one value for the product characteristic based on a specification, the specification being selected from at least one of a predetermined specification, and a real-time calculation taken from a plurality of prior observed values.

10. The method of claim 1, wherein determining a value for uncontrollable error from the variance comprises determining a first portion of the variance caused by uncontrollable error and a second portion of the variance caused by controllable error.

11. The method of claim 10, wherein determining the first and second portions of the variance comprises defining a relationship between the first and second portions of the variance as:

$$V_x = \rho_1^2 * V_x + V_w$$

where w=white noise
x=systematic error
$V_x$=variance of the controllable error
$V_w$=variance of the uncontrollable error
$\rho_1$ is an autocorrelation factor for a lag of 1.

12. The method of claim 10, wherein determining the first and second portions of the variance comprises defining a relationship between the first and second portions of the variance as:

$$\delta_x = y/(1+z),$$

where is $\delta_x$ represents the second portion of the variance,
y=calculated standard deviation from N previous products, and $z=(1-\rho_1^2)^{0.5}$, where $\rho_1$ is an autocorrelation factor for a lag of 1.

13. A computer program product for controlling a manufacturing process, the computer program product comprising:
    (a) at least one computer readable medium;
    (b) instructions, provided on the at least one computer readable medium, for inputting a model for the manufacturing process and obtaining a manufacturing recipe based on the model, wherein the model predicts at least one value for a product characteristic of at least one product processed by the manufacturing process;
    (c) instructions, provided on the at least one computer readable medium, for receiving at least one observed value for the product characteristic of the at least one product and calculating a variance between the at least one observed value and the at least one predicted value;
    (d) instructions, provided on the at least one computer readable medium, for calculating value for uncontrollable error from the variance;
    (e) instructions, provided on the at least one computer readable medium, for updating a process threshold based upon the value for uncontrollable error; and
    (f) instructions, provided on the at least one computer readable medium, for adjusting at least one control parameter of the manufacturing process using the undated process threshold,
    wherein the manufacturing process includes at least one device on which the at least one product is processed, the at least one device being affected by the at least one control parameter.

14. The computer program product of claim 13, wherein the at least one observed value is observed for the at least one products including at least one semi-conductor wafers, and the computer readable medium is readable by the manufacturing process including an automated semi-conductor manufacturing process.

15. The computer program product of claim 13, wherein the at least one predicted value is derived from a specification, the specification being selected from at least one of a predetermined specification, and a real-time calculation taken from a plurality of prior observed values of products.

16. The computer program product of claim 13, wherein the uncontrollable error includes at least one of random variance, normal deviation, and an ambient fluctuation.

17. The computer program product of claim 13, wherein the instructions for calculating the variance comprise instructions for calculating the variance from the at least one observed value observed for N previously processed products.

18. The computer program product of claim 17, wherein N is in the range of 5 to 100.

19. The computer program product of claim 17, wherein N is in the range of 10 to 40.

20. The computer program product of claim 13, wherein the instructions for calculating the uncontrollable error comprises instructions for calculating the uncontrollable error using an auto-regressive stochastic sequence.

21. The computer program product of claim 13, wherein the instructions for calculating the value for uncontrollable error comprises instructions for calculating a first portion of the variance caused by uncontrollable error and a second portion of the variance caused by controllable error.

22. The computer program product of claim 21, wherein the instructions for calculating the first and second portions of the variance comprises instructions for defining a relationship between the first and second portions of the variance as:

$$V_x = \rho_1^2 * V_x + V_w$$

where w=white noise
x=systematic error
$V_x$=variance of the controllable error
$V_w$=variance of the uncontrollable error
$\rho_1$ is an autocorrelation factor for a lag of 1.

23. The computer program product of claim 21, wherein the instructions for calculating the first and second portions of the variance comprises instructions for defining a relationship between the first and second portions of the variance as:

$$\delta_x = y/(1+z),$$

where is $\delta_x$ represents the second portion of the variance,
y=calculated standard deviation from N previous products, and
$z=(1-\rho_1^2)^{0.5}$, where $\rho_1$ is an autocorrelation factor for a lag of 1.

24. A system for controlling a manufacturing process, comprising:
    (a) means for inputting a model for the manufacturing process and obtaining a manufacturing recipe based on the model, wherein the model predicts at least one value for a product characteristic of at least one product processed by the manufacturing process;
    (b) means for receiving at least one observed value for the product characteristic of the at least one product and determining a variance between the at least one observed value and the at least one predicted value;
    (c) calculating means for determining a first portion of the variance caused by uncontrollable error and a second portion of the variance caused by controllable error;
    (d) calculating means for updating a process threshold using either the first or second portion of the variance; and
    (e) means for adjusting at least one control parameter of the manufacturing process using the updated process threshold;
    wherein the manufacturing process comprises at least one device on which the at least one product is processed, the at least one device being affected by the at least one control parameter.

25. The system of claim 24, wherein the variance is determined from the at least one observed values for N previously processed products.

26. The system of claim 24, wherein the first portion of the variance includes at least one of random variance, normal deviation, and an ambient fluctuation.

27. The system of claim 24, wherein the calculating means for determining a first and second portions of the variance defines a relationship between the first and second portions of the variance as:

$$V_x = \rho_1^2 * V_x + V_w$$

where w=white noise
x=systematic error
$V_x$=variance of the controllable error
$V_w$=variance of the uncontrollable error
$\rho_1$ is an autocorrelation factor for a lag of 1.

28. The system of claim 24, wherein the calculating means for determining a first and second portions of the variance defines a relationship between the first and second portions of the variance as:

$$\delta_x = y/(1+z),$$

where is $\delta_x$ represents the second portion of the variance, y=calculated standard deviation from N previous products, and
$z=(1-\rho_1^2)^{0.5}$, where $\rho_1$ is an autocorrelation factor for a lag of 1.

29. The system of claim 24, wherein the calculating means for determining a first and second portions of the variance determines the first and second portions of the variance using an auto-regressive stochastic sequence.

30. The system of claim 24, further comprising:

calculating means for updating the at least one control parameter of the manufacturing process using the first portion of the variance.

31. The system of claim 30, wherein the calculated first portion of the variance is used as a weighing factor to adjust an estimated gain in the updating of the at least one control parameter.

* * * * *